United States Patent

Kanai et al.

Patent Number: 5,852,135
Date of Patent: Dec. 22, 1998

[54] THERMOPLASTIC RESIN COMPOSITIONS AND A METHOD OF PRODUCING THE SAME

[75] Inventors: Hiroyuki Kanai, Fuji; Hajime Serizawa, Mishima; Mitsunori Matsushima, Shizuoka, all of Japan

[73] Assignee: Polyplastics Co., Ltd., Japan

[21] Appl. No.: 750,523

[22] PCT Filed: Oct. 19, 1995

[86] PCT No.: PCT/JP95/02139

§ 371 Date: Dec. 12, 1996

§ 102(e) Date: Dec. 12, 1996

[87] PCT Pub. No.: WO96/34053

PCT Pub. Date: Oct. 31, 1996

[30] Foreign Application Priority Data

| Apr. 19, 1995 | [JP] | Japan | 7/129432 |
| Aug. 2, 1995 | [JP] | Japan | 7/218188 |
| Aug. 18, 1995 | [JP] | Japan | 7/233263 |
| Aug. 29, 1995 | [JP] | Japan | 7/245363 |
| Sep. 28, 1995 | [JP] | Japan | 7/276645 |
| Sep. 28, 1995 | [JP] | Japan | 7/276646 |
| Oct. 4, 1995 | [JP] | Japan | 7/284635 |

[51] Int. Cl.$^6$ ............................................. C08L 61/02
[52] U.S. Cl. ........................... 525/398; 525/399; 525/400
[58] Field of Search ................................. 525/398, 399, 525/400

[56] References Cited

U.S. PATENT DOCUMENTS 5,183,860  2/1993  Kashihara ........................ 525/398

FOREIGN PATENT DOCUMENTS

| 47-19425 | 3/1972 | Japan . |
| A-49-74790 | 7/1974 | Japan . |
| B-58-18383 | 4/1983 | Japan . |
| A-60-219252 | 1/1985 | Japan . |
| B-60-6969 | 2/1985 | Japan . |
| A-3-21618 | 1/1991 | Japan . |
| A-3-21619 | 1/1991 | Japan . |
| 3-292314 A | 12/1991 | Japan . |
| 5-32857 A | 2/1993 | Japan . |
| A-5214212 | 8/1993 | Japan . |
| 1172741 | 9/1967 | United Kingdom . |

*Primary Examiner*—Edward J. Cain
*Attorney, Agent, or Firm*—Nixon & Vanderhye P. C.

[57] ABSTRACT

A resin composition comprises (1) a thermoplastic resin and (2) a modified polyacetal wherein a residue of a polymerizable compound having a functional group such as an epoxy group, a carboxyl group, an acid anhydride group or others is introduced to a base polyacetal in a proportion of 0.1 to 30% by weight relative to the base polyacetal. The thermoplastic resin includes various polymers such as an olefinic polymer, a styrenic polymer, a polyester, a polyamide and so on. The thermoplastic resins can be used singly or in combination, and the latter combination includes a combination of two or more species of resins being immiscible with each other, a combination of a polyacetal and a resin except for a polyacetal (e.g. an elastomer, etc.) and other combinations. The relative ratio of (1) the thermoplastic resin to (2) the modified polyacetal is such that the former/the latter equals about 1/99 through 99/1 (by weight).

36 Claims, No Drawings

THERMOPLASTIC RESIN COMPOSITIONS AND A METHOD OF PRODUCING THE SAME

TECHNICAL FIELD

This invention relates to a resin composition comprising a modified polyacetal, which has improved affinities for polymers and is useful for obtaining a polymer alloy, and to a method of producing the resin composition.

BACKGROUND TECHNOLOGY

A polyacetal has excellent mechanical strength, slidability, heat resistance, chemical resistance, moldability (formability) and electrical characteristics (electrical properties), and hence is generally employed as an engineering plastic in various fields. Such polyacetal is, however, not always satisfactory in acid resistance, adhesion (adhesive properties), painting quality, printing quality, dye affinity, weather resistance or other properties.

Therefore, such compositions have been expected as produced by alloying the polyacetal with other thermoplastic resin for supplying disadvantages of the polyacetal and for imparting the excellent characteristics of the polyacetal to the counter resin of the alloying and hence to effectively exhibit advantages of the both resins. The polyacetal is, however, extremely poor in affinities and compatibilities (miscibilities) with respect to other materials. Accordingly, when the polyacetal is blended with other thermoplastic resin, the characteristics of the both resins do not exhibit with validity, and the resultant composition only provides remarkably low weld strength and weld elongation. In particular, such significantly low weld strength and weld elongation seriously interfere with commercial production of an alloy of the polyacetal and other thermoplastic resin.

For the purpose of improving affinities of the polyacetal, it is effective to introduce an adequate modifying group into the polyacetal for modification, and various technologies for modification of the polyacetal by introducing a variety of modifying groups have been proposed [e.g. Japanese Patent Publication No. 23467/1968 (JP-B-43-23467), Japanese Patent Publication No. 19425/1972 (JP-B-47-19425), Japanese Patent Application Laid-open No. 21618/1991 (JP-A-3-21618), Japanese Patent Application Laid-open No. 21619/1991 (JP-A-3-21619), etc.].

These technologies, however, are technologies in which a modifying group is directly introduced into a polyacetal in polymerization step by copolymerizing formaldehyde or trioxane with a comonomer having a variety of a modifying group as a substituent (e.g. a cyclic ether or cyclic acetal each having aminoaldehyde, a nitro group, a nitrile group, a carboxyl group or an amide group). Therefore, according to these technologies, polymerization reactivity is sacrificed and hence a copolymer with a high molecular weight can not be obtained in a high yield.

Further, a process for producing a reinforcing agent-containing resin composition which comprises adding a reactive compound having a variety of modifying group to a polyacetal resin as produced previously by polymerization, and melting and kneading the resultant mixture in the presence of a filler and a free-radical initiator has been proposed, for the purpose of enhancing reinforcing effects by means of the reinforcing agent [e.g. Japanese Patent Publication No. 18383/1983 (JP-B-58-18383), Japanese Patent Publication No 6969/1985 (JP-B-60-6969)].

According to these technologies, however, introduction efficiency of the modifying group is extremely low and the polyacetal is decomposed and degraded in melting and kneading step, and hence these technologies will not be effective modifying processes. Moreover, resultant compositions obtained by these technologies beforehand contain specific reinforcing agents so that they can not be applied to various polymer alloys in a broad range which comprise two or more species of resins being immiscible (incompatible) with each other, and hence the resin composition needs to be prepared for every application, respectively. In particular, when two or more species of thermoplastic resins immiscible (incompatible) with each other are employed, they are hardly molten and mixed homogeneously, so that homogeneous modification and polymer alloying can not be expected according to the above mentioned technologies.

Moreover, when the free-radical initiator and the polyacetal are molten and kneaded, the polyacetal resin is decomposed and degraded due to the free-radical initiator to give a polyacetal with a decreased molecular weight [Japanese Patent Application Laid-open No. 219252/1985 (JP-A-60-219252), Japanese Patent Application Laid-open No. 74790/1974 (JP-A-49-74790), British Patent No. 1172741]. Therefore, use of a radical polymerization initiator such as an organic peroxide can hardly insure modification or reforming of a polyacetal with maintaining a high molecular weight, excellent mechanical characteristics and electrical characteristics. Further, mechanical characteristics or other properties of a resin composition are not satisfactorily improved even by alloying to give a composite, with a decreasing molecular weight of the polyacetal. Probably for this reason, Japanese Patent Application Laid-open No. 214212/1993 (JP-A-5-214212) proposes a reforming (modification) process of a polyoxymethylene resin by adding a modified polyolefin modified with a polymerizable monomer having a glycidyl group and an amide bond, without direct modification of the polyacetal.

It is, therefore, an object of the present invention to provide a resin composition which effectively imparts excellent characteristics of a polyacetal to a thermoplastic resin and has high weld strength and elongation.

It is another object of the invention to provide a resin composition which insures effective alloying of two or more species of thermoplastic resins being immiscible with each other.

A further object of the invention is to provide a thermoplastic resin composition which provides exhibition of characteristics of both of a polyacetal and other thermoplastic resin with effectiveness.

It is a yet another object of the invention to provide a resin composition having remarkably improved mechanical characteristics such as impact resistance and other characteristics.

A still further object of the invention is to provide a resin composition which ensures alloying of a polyacetal and a various thermoplastic resin in a broad range and provides effective exhibition of characteristics of both the polyacetal and the thermoplastic resin.

Another object of the invention is to provide a resin composition which comprises a modified polyacetal having high affinities with respect to a thermoplastic resin, an impact resistance improver, a reinforcing agent and/or a filler, and provides a composite with such thermoplastic resin, impact resistance improver, reinforcing agent and/or filler with effectiveness, and is useful for production of a shaped or molded article having satisfactory mechanical characteristics, slidability and/or heat resistance.

It is a yet another object of the invention to provide a method of producing a resin composition which provides the resin composition having above mentioned excellent characteristics in a simple and easy manner with high efficiency.

DISCLOSURE OF THE INVENTION

The present inventors made intensive investigations to achieve the above objects, and, as a result, found that a modified polyacetal as produced by modifying a polyacetal with a polymerizable compound has high affinities not only for a polyacetal but also for various thermoplastic resins, and that such modified polyacetal plays a role as compatibilizing agent with respect to plural thermoplastic resins being immiscible with each other and hence improves weld strength and elongation and/or impact resistance of a resin composition. The present invention has been accomplished on the basis of the above findings.

Thus, the thermoplastic resin composition of the present invention comprises (1) at least one thermoplastic resin, and (2) a modified polyacetal which is introduced, to a base polyacetal, with a residue of a polymerizable compound having at least one functional group selected from the group consisting of an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group containing a nitrogen atom as a hetero atom. The introducing amount of the residue of the polymerizable compound in the modified polyacetal is, for example, about 0.1 to 30% by weight.

The polymerizable compound having a functional group may have plural ethylenically unsaturated bonds per molecule, but it may practically have one ethylenically unsaturated bond per molecule for the purpose of inhibiting excessive crosslinking in the modification process. As the polymerizable compound, a compound having a boiling point of not lower than 70° C. at atmospheric pressure (ordinary pressure) may practically be employed. Among the above mentioned functional groups, the nitrogen atom of the amide group may be bonded with a non-condensible functional group. The heterocyclic group includes, for instance, a cyclic imino ester group, a cyclic imino ether group and the like.

The thermoplastic resin (1) may comprise; (a) single resin or in combination of resins in case they are compatible with each other to impart excellent characteristics to the thermoplastic resin(s) and hence to improve weld strength and weld elongation of the resin composition, (b) two or more species of resins being incompatible with each other to insure effective alloying of these resins and hence to exhibit characteristics of each resins effectively, or (c) a polyacetal and a resin except for a polyacetal to give a composite of the polyacetal and the thermoplastic resin with efficacy and to exhibit the characteristics of the both components satisfactorily. Further, the thermoplastic resin composition of the present invention also includes a resin composition which comprises (1a) a polyacetal, (1e) an elastomer, and (2a) a modified polyacetal in which an epoxy group is introduced into a base polyacetal. This resin composition is useful for enhancement of impact resistance and mechanical characteristics.

Moreover, (d) a resin composition comprising a core-sheath polymer as an impact resistance improver together with the modified polyacetal (2a) in addition to the thermoplastic resin (in particular, the polyacetal (1a), etc.) is useful for enhancing the impact resistance.

(e) The thermoplastic resin composition of the present invention may be composed of (I) a modified polymer composition comprising (1c) a modified polymer except for a modified polyacetal and (1d) a non-modified polymer except for a polyacetal, and (II) a modified polyacetal resin composition comprising (2) a modified polyacetal and (1a) a polyacetal to alloy various thermoplastic resins in a broad range effectively and thereby give a composite.

According to the method of the present invention, a resin composition is produced by mixing (1) at least one thermoplastic resin and (2) the modified polyacetal.

It should be understood that the term "thermoplastic resin" as used in the present specification means a thermoplastic resin except for a modified polyacetal. The term "polyacetal" means and includes a non-modified polyacetal homopolymer or a non-modified polyacetal copolymer, otherwise specifically referred to. The term "residue of the polymerizable compound" means and includes not only a unit of a monomer of the polymerizable compound but also a polymer of such monomer (e.g. a dimer, trimer, tetramer or other polymer component each formed by polymerization). The term "graft polymerization" means that the residue (unit) of the polymerizable compound bonds to a backbone chain, side chain or terminal of a polymer. The term "modification" indicates introduction of a functional group with the use of a component except for a constitutive component of the backbone of a polymer. Further, the term "non-self-condensible functional group" means a functional group capable of condensing without interposition of a reactive component, such as a methylol group. An acrylic monomer and a methacrylic monomer are generically referred to as "(meth)acrylic monomer" otherwise specifically mentioned.

DETAILED DESCRIPTION OF THE INVENTION

The resin composition of the present invention comprises (1) the thermoplastic resin and (2) the modified polyacetal. The contents of the thermoplastic resin (1) and the modified polyacetal (2) are as follows.

(1) Thermoplastic resin

The species of the thermoplastic resin is not particularly limited and the thermoplastic resin includes olefinic polymers, diene-series polymers, acrylic polymers, styrenic polymers, vinyl polymers such as poly(vinyl chloride), polyesters, polyamides, polycarbonates, polyurethanes, polyethers, polyacetals, poly(phenylene ether), polysulfones, poly(ether sulfone), poly(ether imide), poly (amide imide), fluorine-containing resins and other thermoplastic resins. These thermoplastic resins can be used singly or in combination.

The olefinic polymer includes, for example, a homopolymer or copolymer (e.g. random copolymers, block copolymers or graft copolymers) of an α-olefin such as ethylene, propylene, butene, hexene, octene, nonene, decene and dodecene, and a random copolymer, block copolymer, a graft copolymer each of which comprises the α-olefin as a main component, and further comprises at least one comonomer component. As examples of the comonomer component, there may be mentioned nonconjugated dienes (e.g. 1,4-hexadiene, dicyclopentadiene, 5-ethyl-iden-2-norbornene, 2,5-norbornadiene, etc.), conjugated dienes (e.g. butadiene, isoprene, piperilene), α,β-un-saturated carboxylic acids or their derivatives (e.g. acrylic acid, methacrylic acid, their anhydrides, an alkyl ester of (meth)acrylic acid), acrylonitrile, aromatic vinyl compounds (e.g. styrene, α-methylstyrene), vinyl esters (e.g. vinyl acetate, etc.), vinyl ethers (e.g. vinyl methyl ether), derivatives of these vinyl compounds and so forth. The polymerization degree, the presence or absence of a side chain and/or branch, branching degree, copolymerization composition ratio of the olefinic polymer are not specifically restricted.

In more detail, examples of the olefinic polymer include a high density polyethylene, a medium density polyethylene, a low density polyethylene, a linear low density polyethylene and other polyethylene, polypropylene, polybutene, polybutylene, methylpentene resin, an ethylene-α-olefin copolymer (e.g. an ethylene-propylene copolymer, an ethylene-1-butene copolymer, etc.), an ethylene-propylene-diene copolymer, an ethylene-vinyl acetate copolymer and other ethylene-vinyl ester copolymers, an ethylene-acrylic acid copolymer, an ethylene-acrylate copolymer (e.g. an ethylene-ethyl acrylate copolymer), ionomers and so on. Preferred examples of the olefinic polymer include a polyethylene, a polypropylene, ethylene-α-olefin copolymers such as an ethylene-propylene copolymer and an ethylene-1-butene copolymer.

The diene-series polymer includes a homo or copolymer comprising a conjugated diene such as butadiene, isoprene, chloroprene or others as a main component. As the diene-series polymer, there may be mentioned, for instance, polybutadiene, polyisoprene, polychloroprene, an acrylonitrile-butadiene copolymer and the like.

Examples of the styrenic polymer include a homo- or co-polymer (a random copolymer, a block copolymer or a graft copolymer) of an aromatic vinyl compound such as styrene, α-methylstyrene, vinyltoluene, t-butylstyrene and chloromethylstyrene; a copolymer of the aromatic vinyl compound and an acrylic monomer and/or maleic anhydride or a derivative thereof. As examples of the acrylic monomer, there may be mentioned acrylonitrile, methacrylonitrile, acrylic acid, methacrylic acid, methyl acrylate, methyl methacrylate and other (meth)-acrylic acid esters. The maleic anhydride or its derivative includes maleic anhydride, N-methylmaleimide, N-phenylmaleimide and so forth.

Further, use can also be made of a copolymer as produced by polymerizing the aromatic vinyl compound and acrylic monomer with a diene monomer (e.g. butadiene), an olefin (e.g. ethylene, propylene) and/or an elastomer (a butadiene rubber, an acrylic rubber, a chlorinated polyethylene, an ethylene-propylene-diene rubber, an ethylene-vinyl acetate copolymer and other rubber components), or its hydrogenated product. Regarding these copolymers, the mode or species of copolymerization such as random, block or graft copolymerization, polymerization degree, the presence or absence of a side chain or branch and its degree, composition ratio of copolymerization or other characteristics are not particularly limited.

As the styrenic polymer, there may be mentioned, for example, polystyrene, a styrene-(meth)acrylic acid copolymer, an acrylonitrile-styrene copolymer, a high impact polystyrene, a styrene-maleic anhydride copolymer, a styrene-methyl acrylate copolymer, a styrenemethyl methacrylate copolymer, a styrene-acrylonitrile-butadiene copolymer, a hydrogenated product of a styrene-acrylonitrile-butadiene copolymer, a styrene-acrylonitrile-ethylene copolymer, a styrenic block copolymer [e.g. a styrene-butadiene-styrene (SBS) copolymer, a styrene-isoprene-styrene (SIS) copolymer, a styrene-ethylene-butylene-styrene (SEBS) copolymer, etc.]. Preferred styrenic polymer includes polystyrene, an acrylonitrile-styrene copolymer, a styrene-maleic anhydride copolymer, a high impact polystyrene, a styrene-acrylonitrile-butadiene copolymer and a styrenic block copolymer, typically speaking.

The acrylic polymer includes, for example, a homo- or co-polymer comprising, as a main component, a unit of acrylic acid, methacrylic acid or an ester of these acids, such as poly(methyl methacrylate), a methyl meth-acrylate-(meth)acrylic acid copolymer, a methyl methacrylate-alkyl acrylate copolymer, an acryl-styrene copolymer, an acrylic rubber and the like. Poly(methyl methacrylate) or acrylic rubber may practically be employed among these acrylic polymers.

As the vinyl polymer, there may be mentioned, in addition to the poly(vinyl chloride), poly(vinyl acetate), poly(vinyl alcohol), poly(vinyl acetal), poly (vinyl ether), poly(vinyl ketone), poly(vinyl pyrrolidone) and a vinyl chloride-vinyl acetate copolymer, typically speaking.

The term "polyester" means and includes a polymer having an ester bond in the backbone chain, and such polyester can be obtained by polycondensation (condensation polymerization) of a dicarboxylic acid or its derivative and a dihydric alcohol, polycondensation of a hydroxycarboxylic acid, or ring-opening polymerization of a cyclic ester.

The polyester includes, for instance, a poly(alkylene terephthalate) [e.g. poly(ethylene terephthalate), poly (butylene terephthalate), etc.], a copolyester having an alkylene terephthalate as a main repeating unit and further comprising isophthalic acid, bisphenol A, cyclohex-anedimethanol or other copolymeric component, an aromatic polyester (e.g. a polyarylate as produced by esterification of an aromatic diol such as bisphenol A, and an aromatic dicarboxylic acid such as terephthalic acid or isophthalic acid). The polyester also includes a liquid crystalline polyester or a polyester elastomer. Among them, poly(ethylene terephthalate), poly(butylene terephthalate) and other poly(alkylene terephthalate) and a copolyester each having the above component as main component, an aromatic polyester, a liquid crystalline polyester or a polyester elastomer can preferably be used.

The polyamide is a polymer having an amide bond in the backbone chain (main chain), and generally obtainable by polycondensation of a dicarboxylic acid and a diamine, or ring-opening polymerization of a lactam.

As examples of the polyamide, there may be mentioned an aliphatic polyamide (e.g. polyamide 6, polyamide 12, polyamide 11, polyamide 46, polyamide 66, polyamide 610, polyamide 612, and a copolymerized polyamide containing a constitutive monomeric unit of these polyamides), an aromatic polyamide and so forth. The polyamide also includes a liquid crystalline polyamide, a liquid crystalline copolyesteramide or a polyamide elastomer. Among these polyamides, use can preferably be made of polyamide 6, polyamide 66, polyamide 11, polyamide 12, and other aliphatic polyamides, aromatic polyamides, a liquid crystalline polyesteramide and a polyamide elastomer.

The term "polycarbonate" as used in the specification means a polymer having a carbonate bond in the backbone chain, and such polycarbonate is usually obtainable by polycondensation of a dihydroxy compound and phosgene (carbonyl chloride) or transesterification between a dihydroxy compound and a carbonate.

As the polycarbonate, whichever of aliphatic, alicyclic and aromatic polycarbonates may be used. Preferred polycarbonate includes, for instance, an aromatic polycarbonate, and among others, a bisphenol-series polycarbonate such as a bisphenol A-series polycarbonate can advantageously be used.

The polyurethane is a polymer containing a urethane bond in the backbone chain and includes, for instance, thermoplastic polyurethanes as produced by means of reaction of a polyisocyanate component such as an aliphatic, alicyclic or aromatic polyisocyanate (e.g. hexamethylene diisocyanate, isophorone diisocyanate, tolylene diisocyanate, diphenylmethane diisocyanate, naphthalene diisocyanate, etc.) and a polyol component with a low molecular weight or high molecular weight (e.g. ethylene glycol, propylene glycol, 1,4-butanediol, polyester diol, polyether diol, polycarbonate diol, etc.). The polyurethane may also be a polyurethane elastomer.

The polyether is a polymer having an ether bond in the backbone chain, and is obtainable by ring-opening polymerization of a cyclic ether, or self-condensation of a glycol. As the polyether, there may be mentioned poly(ethylene oxide), poly(propylene oxide) and poly(tetramethylene oxide), for instance.

The thermoplastic resin further includes an engineering plastic such as a polyacetal, poly(phenylene ether), a modified poly(phenylene ether) or other poly(phenylene ether) [poly(phenylene oxide)], polysulfone, poly(ether sulfone), poly(ether imide), poly(amide imide) and the like.

The preferred engineering plastic includes (1a) the polyacetal.

The polyacetal (1a) is a high molecular weight compound having an oxymethylene group (—$CH_2O$—) as a main constitutive unit. The polyacetal includes a polyoxymethylene homopolymer and a polyacetal copolymer. This polyacetal copolymer comprises, in addition to the oxymethylene group, an oxyalkylene unit having about 2 to 6 carbon atoms, preferably about 2 to 4 carbon atoms (e.g. oxyethylene group (—$CH_2CH_2O$—), oxypropylene group, oxytetramethylene group and the like), and more preferably oxyethylene group as a copolymeric unit and as a constitutive unit. That is, the copolymer is a copolymer having at least one oxyalkylene unit —$(CH_2)_nO$—, wherein n represents an integer of 2 to 6, as a copolymerizable unit in a part of the backbone chain. The backbone chain of the base polyacetal may comprise a copolymeric unit in addition to the oxyalkylene unit.

The proportion of the oxyalkylene group having about 2 to 6 carbon atoms (content of the comonomer unit) may optionally be selected according to the intended use of the polyacetal, and is, for example, about 0.1 to 30 mole percent, and preferably about 1 to 20 mole percent based on the total of the polyacetal. The content of the comonomer unit may practically be not greater than 10 mole percent (e.g. about 0.03 to 10 mole percent), preferably about 0.03 to 7 mole percent (e.g. about 0.05 to 5 mole percent) and more preferably about 0.1 to 5 mole percent based on the total of the polyacetal.

The polyacetal copolymer may comprise plural components, such as a copolymer comprising two components, or a terpolymer comprising three components. The polyacetal copolymer is generally a random copolymer but it may be any of a block copolymer, a graft copolymer or others. The polyacetal may have not only a linear structure but also a branched structure, and it may have a crosslinking structure. Further, the terminal of the polyacetal may be stabilized by, for example, esterification with acetic acid, propionic acid, butyric acid or other carboxylic acids. The polymerization degree, branching degree and crosslinking degree of the polyacetal are not particularly limited as far as the polyacetal being moldable (formable) by melting.

Preferred polyacetal includes a polyoxymethylene, a polyacetal copolymer (e.g. a copolymer comprising at least an oxymethylene unit and an oxyethylene unit). From the view point of heat stability, a polyacetal copolymer is desirable.

The polyacetal (1a) may be prepared by polymerizing, for example, formaldehyde, paraformaldehyde, acetaldehyde or other aldehydes, trioxane, ethylene oxide, propylene oxide, 1,3-dioxolan or other cyclic ethers.

As the fluorine-containing resin (fluororesin), there may be mentioned, for instance, a homo- or copolymer having a fluorine-containing monomeric unit such as tetrafluoroethylene, chlorotrifluoroethylene, hexafluoropropylene, a perfluoroalkyl vinyl ether, vinylidene fluoride and vinyl fluoride. Thus, the fluorine-containing resin includes, for example, polytetrafluoroethylene, a tetrafluoroethylene-hexafluoropropylene copolymer, an ethylene-tetrafluoroethylene copolymer, a tetrafluoroethylene-perfluoroalkyl vinyl ether copolymer, an ethylene-chlorotrifluoroethylene copolymer, polychlorotrifluoroethylene, poly(vinylidene fluoride), poly(vinyl fluoride) and so forth.

Examples of the other thermoplastic resin includes cellulose acetate and other cellulosic polymers.

A resin composition comprising the thermoplastic resin and an impact resistance improver (e.g. a core-sheath polymer) in combination is desirable for imparting impact resistance to the composition. In particular, combination use of the polyacetal and the core-sheath polymer insures effective improvement of the impact resistance.

The core-sheath polymer (core-shell polymer) comprises a polymer particle having a multiphase structure such as core-sheath structure. In other words, the core-sheath polymer is a polymer having a core of a rubber-like polymer (rubber elastic body) or rubber-like polymer phase, and a shell (sheath) of a glassy polymer in the outermost layer, and is obtainable by, usually, seed emulsion polymerization with the use of a monomer, a surfactant such as a nonionic surfactant, a polymerization initiator and water. Such seed emulsion polymerization technology includes, for example, the multistage emulsion polymerization method which comprises polymerizing the monomer in a succeeding step in the presence of a polymer particle formed in a preceding step. With respect to the production of the core-sheath polymer according to the seed emulsion polymerization, Japanese Patent Application Laid-open No. 14856/1991 (JP-A-3-14856) and Japanese Patent Application Laid-open No. 271361/1993 (JP-A-5-271361) or other literatures can be referred to.

As examples of the monomer constituting the rubber-like polymer in the polymerization of the first step, there may be mentioned a polymerizable monomer constituting a rubber elastic body having a glass transition temperature of not higher than –30° C. (e.g. from about –40° C. to about –100° C.), such as a conjugated diene (e.g. butadiene) or a $C_{2-8}$ alkyl-acrylate (e.g. ethyl acrylate, butyl acrylate, etc.), or a mixture thereof. In the first polymerization step, a copolymerizable monomer such as styrene and other aromatic vinyl, acrylonitrile, an alkyl methacrylate may be copolymerized therewith.

In the first polymerization step, when the content of the conjugated diene in the monomer is about 0 to 20% by weight, use of a crosslinkable monomer [e.g. butylene glycol di(meth)acrylate, hexanediol di(meth)acrylate] and a grafted monomer [e.g. allyl (meth)acrylate and other allyl esters of a unsaturated carboxylic acid] in a small amount (e.g. about 0 to 5% by weight, preferably about 0.1 to 2% by weight based on the total amount of the monomer) insures high impact resistance.

The glass transition temperature of the glassy polymer constituting the shell (sheath) of the outermost layer is, for example, not lower than 40° C. (e.g. about 50° to 120° C.), and preferably not lower than 60° C. (e.g. about 70° to 120°

C.). The monomer constituting the glassy polymer includes, for instance, methyl methacrylate, ethyl methacrylate and other $C_{1-4}$ alkyl-methacrylate (in particular, methyl methacrylate), and a monomer (e.g. ethyl acrylate, styrene, acrylonitrile, etc.) being copolymerizable with these methacrylates. The shell (sheath) of the core-sheath polymer may be introduced with a functional group by means of copolymerization with a polymerizable monomer having a functional group such as a carboxyl group, an acid anhydride group, an epoxy group, an amide group, a hydroxyl group and the like.

The relative ratio of the core composed of the rubber-like polymer to the sheath composed of the glassy polymer may be selected from a range not interfering with the impact resistance, and is, for instance, such that the core/the sheath equals about 40/60 to 95/5 (weight %), preferably about 50/50 to 90/10 (weight %), and more preferably about 60/40 to 80/20 (weight %).

In the core-sheath polymer, an intermediate layer may be interposed between the core and the sheath. The intermediate layer may be formed by polymerizing, for example, the polymerizable monomer having a functional group, the polymerizable monomer constituting the glassy polymer or the polymerizable monomer constituting the rubber-like polymer in an optional step of the seed multistage emulsion polymerization. The proportion of the polymerizable monomer constituting the intermediate layer is about 1 to 50% by weight, and preferably about 5 to 30% by weight based on the total weight of the monomer, typically speaking. When the intermediate layer is a glassy polymer, the intermediate layer may be considered as a part of the sheath, and when the intermediate layer is a rubber-like polymer, it may be considered as a part of the core. The construction of the core-sheath polymer having the intermediate layer may for example be a multilayer structure having a layer interposed between the core and the sheath, or a so-called "salami" structure in which the intermediate layer is dispersed in the form of a particle in the core.

Among them, preferred thermoplastic resin for the purpose of utilizing the excellent characteristics of the modified polyacetal includes, for instance, polyethylene, polypropylene, an ethylene-α-olefin copolymer, an olefinic elastomer and other olefinic polymers; poly(methyl methacrylate), acrylic rubber and other acrylic polymers; polystyrene, a high impact polystyrene, an acrylonitrile-styrene copolymer, a styrene-maleic anhydride copolymer, a styrene-acrylonitrile-butadiene copolymer, a styrenic block copolymer and other styrenic polymers; poly(vinyl chloride); a poly(alkylene terephthalate), a copolyester containing an alkylene terephthalate as a main component, polyarylate, a liquid crystalline polyester, a polyester elastomer and other polyesters; an aliphatic polyamide (e.g. polyamide 6, polyamide 66, polyamide 11, polyamide 12), an aromatic polyamide, a liquid crystalline copolyesteramide, a polyamide elastomer and other polyamides; a bisphenol A series polycarbonate and other polycarbonates; polyurethane; polyacetal; poly(phenylene ether); polysulfone; poly(ether sulfone); poly(ether imide); poly(amide imide); polytetrafluoroethylene and other fluorine-containing resins and so on. The thermoplastic resin may be modified, but even the use of a non-modified thermoplastic resin insures effective exhibition of the characteristics of the thermoplastic resin.

The combination use of the thermoplastic resin (e.g. a polyacetal) with the core-sheath polymer is also preferable for enhancement of the impact resistance.

(2) Modified polyacetal

The modified polyacetal comprises (A) a base polyacetal (a polyacetal component) and (B) a residue of a polymerizable compound having a functional group, which is introduced into the base polyacetal.

Base polyacetal

The base polyacetal (A) constituting the modified polyacetal can be classified into (1a) the polyacetal, and a polymerizable polyacetal having a functional group composed of a polymerizablly unsaturated bond such as an ethylenically unsaturated bond. The polyacetal and the polymerizable polyacetal can be distinguished from each other by means of the presence of a functional group composed of a polymerizablly unsaturated bond such as an ethylenically unsaturated bond. The contents of the polyacetal (1a) is as mentioned above.

[Polymerizable polyacetal]

The polymerizable polyacetal is a polyacetal having a polymerizablly unsaturated bond (an ethylenically unsaturated bond, an acetylene bond), and comprises similar components to the polyacetal (1a) except for having a functional group comprising the polymerizablly unsaturated bond. Namely, the polymerizable polyacetal is also a high molecular weight compound containing an oxymethylene group (—$CH_2O$—) as a main constitutive unit, and it may be a copolymer having the oxymethylene unit as a main repeating unit and containing such a comonomer unit as mentioned above.

The polymerizablly unsaturated bond includes an ethylenically unsaturated bond such as a vinyl group and allyl group, and an acetylene bond such as an ethynyl group, each of which can be additionally reactive to the polymerizable compound. Typical example of the polymerizable unsaturated bond includes a vinyl ether group, an allyl group, an isopropenyl group, a vinylphenyl group and an ethynyl group.

The polyacetal having a polymerizablly unsaturated bond may roughly be classified into, according to the production process, a polymerizable polyacetal having an unsaturated bond in a random portion of the polyacetal as a side chain, and a polymerizable polyacetal having an unsaturated bond in the terminal of the polyacetal molecule.

The former polymerizable polyacetal can be prepared by polymerization of formaldehyde or trioxane as a main monomer and, as a comonomer, at least one compound selected from the group consisting of cyclic ethers and cyclic formals each of which has a functional group containing a polymerizablly unsaturated bond, and is copolymerizable with the main monomer. The comonomer may only have a functional group comprising an ethylenically unsaturated bond or other polymerizablly unsaturated bond as a substituent. The preferred polymerizablly unsaturated bond includes an ethylenically unsaturated bond such as a vinyl group or an allyl group. As such comonomer, there may be mentioned a cyclic ether or cyclic formal (e.g. ethylene oxide, 1,3-dioxolan, 1,3-dioxane, butanediol formal and diethylene glycol formal) having a functional group comprising an ethylenically unsaturated bond or other polymerizablly unsaturated bond (e.g. a vinyl ether group, an allyl group, an allyl ether group, an isopropenyl group, a vinylphenyl group, etc.) as a substituent. The preferred comonomer includes, for instance, a compound shown by the following formula (1)

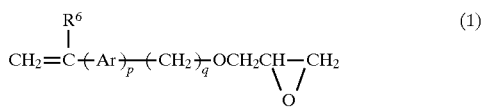

(1)

wherein Ar represents an arylene group or a cycloalkylene group, $R^6$ denotes a halogen atom, a hydrogen atom or a methyl group, P represents 0 or 1, and q denotes an integer of 0 to 3, with a proviso that p and q are not concurrently 0.

In the compound shown by the formula (1), the aryl group includes, phenyl, naphthyl and other groups, and examples of the cycloalkylene group include cycloheptylene, cyclohexylene, cyclooctylene and other $C_{4-10}$ cycloalkylene groups. Preferred coefficient q is 1 or 2, in particular 1.

As the compound shown by the formula (1), there may be mentioned, for example, allyl glycidyl ether, 2-chloroallyl glycidyl ether, 2-bromoallyl glycidyl ether, 2-methylallyl glycidyl ether, 2-vinylethyl glycidyl ether, 4-vinylphenyl glycidyl ether, 2-vinylbenzyl glycidyl ether, 3-vinylbenzyl glycidyl ether, 4-vinylbenzyl glycidyl ether, 2-(4-vinylphenyl)ethyl glycidyl ether and others.

The amount of the comonomer having a polymerizablly unsaturated bond can be selected from a broad range not sacrificing polymerizability or other properties, and is, for instance, about 0.001 to 30 mole percent (e.g. about 0.001 to 10 mole percent), preferably about 0.01 to 8 mole percent and more preferably about 0.1 to 5 mole percent based on the total of the monomer.

Incidentally, in the polymerization, a common cyclic ether or cyclic formal each of which does not have a polymerizablly unsaturated bond (e.g. ethylene oxide, 1,3-dioxolan, 1,3-dioxane, butanediol formal, diethylene glycol formal) may be incorporated as a part of the comonomer to give a multicomponent copolymer containing plural components. The amounts of these cyclic ethers or cyclic formals can be selected from a range according to the composition of the multicomponent copolymer or other factors, and is about 0 to 10 mole percent based on the total of the monomer.

The polymerization reaction may be carried out in a conventional manner such as cationic polymerization (ring-opening polymerization in the presence of a cationically active catalyst such as boron trifluoride and an onium salt) or anionic polymerization.

According to the polymerization reaction as above, the polymerizable polyacetal with a structure having the polymerizablly unsaturated group as a side chain in a random portion of the polyacetal can be obtained.

The latter polymerizable polyacetal, that is, the polyacetal having a functional group comprising a polymerizablly unsaturated bond in the terminal of the molecular chain, may be obtained by polymerizing trioxane or formaldehyde as a main (principle) monomer, and if necessary together with a common cyclic ether or cyclic formal as mentioned above as a comonomer, in the presence of a chain transfer agent having a polymerizablly unsaturated bond. The chain transfer agent may only have a polymerizablly unsaturated bond (e.g. the vinyl group, allyl group or other ethylenically unsaturated bonds, and ethynyl group or other acetylene bonds). As the chain transfer agent, use can be made of allyl alcohol, crotonyl alcohol, α-vinylethyl alcohol and other chain transfer agents each having an ethylenically unsaturated bond, propargyl alcohol and other chain transfer agents each having an acetylene bond, and in addition, a compound shown by the following formula (2)

(2)

wherein $R^7$ and $R^8$ represent, the same or different, a group containing a polymerizablly unsaturated bond, an alkyl group, a cycloalkyl group, an aryl group or an aralkyl group, at least one of $R^7$ and $R^8$ is a group containing a polymerizable unsaturated bond, and x denotes an integer of 1 to 10.

The functional group containing an ethylenically unsaturated bond in the straight-chain formal compound shown by the formula (2) includes the group having a vinyl group, an isopropenyl group or an allyl group as mentioned above, such as a vinyl ether group and allyl ether group, and the functional group containing an acetylene bond incudes, for example, an ethynyl group. As the alkyl group, there may be mentioned methyl, ethyl propyl, isopropyl, butyl or other lower alkyl groups each having about 1 to 4 carbon atoms. Examples of the cycloalkyl group include cyclopentyl, cyclohexyl, cycloheptyl and cyclooctyl groups, and the aryl group includes phenyl and naphthyl groups, for instance. As examples of the aralkyl group, there may be mentioned benzyl, phenetyl and other groups.

In the formula (2), at least one of $R^7$ and $R^8$ may only be a functional group having a polymerizablly unsaturated bond, but both of $R^7$ and $R^8$ may practically be functional groups each having a polymerizablly unsaturated bond. As x, there may liberally be selected from a range of about 1 to 10, preferably about 1 to 5 and specifically about 1 to 3.

The compound shown by the formula (2) includes, for example, divinyl formal, diethylene glycol divinyl ether, trimethylene glycol divinyl ether, methylene glycol monovinyl ether, dimethylene glycol monovinyl ether and so forth.

The amount of the chain transfer agent can be selected from a range according to the desired introducing amount of the polymerizablly unsaturated bond and the molecular weight of the polymerizable polyacetal, and is, for instance, about 0.001 to 2.5% by weight, preferably about 0.005 to 1% by weight, and more preferably about 0.01 to 0.5% by weight relative to the total of the monomer.

The polymerization of the monomer may be conducted by cationically polymerizing or anionically polymerizing the monomer to give a polyacetal having a functional group comprising a polymerizablly unsaturated bond in the terminal of the polyacetal chain.

Further, the polymerizable polyacetal having a functional group containing a polymerizablly unsaturated bond in the terminal of the polyacetal chain can also be obtained by esterifying the terminal of a polyacetal with a carboxylic acid or acid anhydride each having a polymerizablly unsaturated bond (e.g. (meth)acrylic acid, crotonic acid, vinylglycollic acid, maleic acid, maleic anhydride, fumaric acid, itaconic acid and other mono- or di-carboxylic acids each having an ethylenically unsaturated bond or their anhydrides, propiolic acid and other carboxylic acids each having an acetylene bond), wherein the polyacetal is obtainable by polymerization of formaldehyde or trioxane as a main monomer if necessary together with a cyclic ether or cyclic formal as a comonomer.

By employing the above methods in combination, the polymerizable polyacetal having functional groups containing a polymerizablly unsaturated bond in both of the terminal and side chain of the polyacetal chain can be obtained. By way of an example, the polyacetal having functional groups each containing a polymerizable unsaturated bond such as an ethylenically unsaturated bond in the both of the terminal and side chain of the polyacetal chain can be obtained by cationically or anionically polymerizing formaldehyde or trioxane as the main monomer, and a comonomer having an ethylenically unsaturated bond or other polymerizablly unsaturated bond and being copolymerizable with the main monomer, in the presence of the chain transfer agent having a functional group containing the polymerizablly unsaturated bond such as an ethylenically unsaturated bond.

The content of the polymerizable unsaturated bond such as the ethylenically unsaturated bond in the resultant polymerizable polyacetal is, for example, about 0.002 to 5 mole/kg (e.g. about 0.005 to 3 mole/kg), preferably about 0.01 to 2 mole/kg, and practically about 0.01 to 1 mole/kg. The content of the polymerizable unsaturated bond can be controlled by means of the amounts of the comonomer having the polymerizable unsaturated bond, the chain transfer agent and others components. The introducing efficiency of the polymerizable compound is increased and hence comparatively large quantity of the modifying group can be introduced to the base polyacetal with an increasing content of the polymerizable unsaturated bond.

When the terminal of the polymerizable polyacetal is free, the polymerizable polyacetal may be stabilized by esterification with a carboxylic acid such as acetic acid, propionic acid or butyric acid, typically speaking.

[Polymerizable compound]

The modifying group of the polymerizable compound which is introduced into the base polyacetal (A) includes an epoxy group, a carboxyl group, an acid anhydride group, an ester group, a hydroxyl group, an ether group, an amide group, an amino group, a nitrile group, an isocyanate group, an imide group, a cycloalkyl group, an aryl group and a heterocyclic group having a nitrogen atom as a hetero atom, typically speaking. The nitrogen atoms of the amide group and amino group may be bonded with a substituent. The polymerizable compound may be a multifunctional compound having the same or different species of modifying groups in the molecule. These modifying groups are useful for improving affinities for the thermoplastic resin (1), core-sheath polymer or other impact resistance improvers, reinforcing agents, fillers or other additives. Such polymerizable compounds may be employed separately or in combination.

The polymerizable compound having a modifying group requires to have at least one polymerizable group per molecule. A compound having plural polymerizable groups is effective for obtaining a resin composition, which is suitable for blow molding or film molding (film formation), by adding the compound in a small amount to modify the base polyacetal and hence inhibiting an excess crosslinking and restraining increase of melt viscosity. When fluidity (flow property) is required as in a material for an injection molding application, it is preferable that the polymerizable compound has one polymerizable group (e.g. an ethylenic double bond, an acetylene bond) per molecule, in particular one ethylenically unsaturated bond per molecule in order to restrain crosslinking and to improve moldabilities and processabilities. Further, even if being a compound having plural polymerizable groups, a polymerizable compound which forms a linear polymer by intramolecular cyclization such as diallylamine may also be employed.

When the base polyacetal (A) is the polymerizable polyacetal, the polymerizable group of the polymerizable compound (B) usually has addition-reactivity to the polymerizable unsaturated bond of the polymerizable polyacetal. Such polymerizable functional group may preferably be an ethylenically unsaturated bond as similar to the polymerizable polyacetal.

As the compound having an epoxy group, there may be mentioned, for instance, allyl glycidyl ether, chalcone glycidyl ether and other glycidyl ethers; glycidyl (meth)acrylate, glycidyl vinylbenzoate, glycidyl allylbenzoate, glycidyl cinnamate, glycidyl cinnamylideneacetate, glycidyl ester of dimeric acid, an ester of an epoxidated stearyl alcohol and acrylic acid or methacrylic acid, and other glycidyl or epoxy esters; and epoxyhexene, limonene oxide and other epoxidated unsaturated chain-like or cyclic olefins. The glycidyl etherseries polymerizable compound also includes a compound shown by the formula (3) (e.g. N-[4-(2,3-epoxypropoxy)-3,5-dimethylbenzyl]acrylamide, etc.), as mentioned hereinafter. The preferred polymerizable compound having an epoxy group includes a glycidyl etherseries or glycidyl ester-series epoxy compound having (meth)acryloyl group.

Examples of the compound having a carboxylic group include acrylic acid, methacrylic acid, propiolic acid, crotonic acid and other aliphatic unsaturated mono-carboxylic acids; cinnamic acid and other aromatic unsaturated mono-carboxylic acids; maleic acid, fumaric acid, itaconic acid, citraconic acid and other aliphatic unsaturated dicarboxylic acids; monomethyl maleate, monoethyl maleate, monobutyl maleate, monohexyl maleate, monooctyl maleate, mono-2-ethylhexyl maleate and other maleic acid monoesters, fumaric monoesters corresponding to these maleic monoesters, and other unsaturated dicarboxylic acid monoesters. The preferable compound having a carboxylic group includes (meth)acrylic acid, maleic acid and a monoalkyl maleate, typically speaking.

The compound having an acid anhydride group includes, for example, maleic anhydride, itaconic anhydride, citraconic anhydride and himic anhydride. Preferred compound having an acid anhydride group includes maleic anhydride.

Examples of the compound having an ester group include an ester of the polymerizable compound having a carboxylic group such as unsaturated mono- or di-carboxylic acid or the polymerizable compound having an acid anhydride group, and a hydroxy compound containing about 1 to 20 carbon atoms. As the hydroxy compound, there may be mentioned, for instance, methanol, ethanol, 1-propanol, 2-propanol, 1-butanol, 2-methyl-2-propanol, 1-hexanol, 1-octanol, 1-dodecanol, stearyl alcohol and other aliphatic alcohols each having about 1 to 20 carbon atoms (preferably, about 4 to 20 carbon atoms), cyclohexanol and other alicyclic alcohols, benzyl alcohol and other aralkyl alcohols, phenol and other phenols.

Examples of such polymerizable compound include methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, stearyl (meth)acrylate, phenyl (meth)acrylate, benzyl (meth)acrylate and other (meth)acrylates; dimethyl maleate, diethyl maleate, dibutyl maleate, dihexyl maleate, dioctyl maleate, di-2-ethylhexyl maleate, and fumaric esters corresponding to these maleates, and other unsaturated dicarboxylic acid esters.

The compound having an ester group also includes an ester of the polymerizable compound having a hydroxyl group as mentioned hereafter, and an organic carboxylic acid. The compound having an ester group further includes vinyl acetate, vinyl propionate, vinyl butyrate, vinyl caprylate, vinyl laurate, vinyl myristate, vinyl oleate, vinyl stearate and other vinyl esters of organic carboxylic acids each having about 2 to 20 carbon atoms (preferably about 6 to 20 carbon atoms).

Desirable compound having an ester group includes a compound with a comparatively high boiling point, such as alkyl (meth)acrylates each having about 8 to 20 carbon atoms in the alkyl group, and vinyl esters each having about 10 to 20 carbon atoms in the organic carboxylic acid moiety.

As examples of the compound having a hydroxyl group, there may be mentioned allyl alcohol, 2-hydroxyethyl (meth)acrylate, 2-hydroxypropyl (meth)acrylate, butanediol mono(meth)acrylate, hexanediol mono(meth)acrylate, neopentyl glycol mono(meth)acrylate, glycerin mono(meth)acrylate, vinylphenol and so forth. The preferred polymerizable compound having a hydroxyl group includes a hydroxyalkyl (meth)acrylate, generally speaking.

As the compound having an ether group, there may be mentioned, for instance, methoxymethyl (meth)acrylate, ethoxymethyl (meth)acrylate, butoxymethyl (meth)acrylate, methoxyethyl (meth)acrylate, ethoxyethyl (meth)acrylate, butoxyethyl (meth)acrylate and methoxystyrene.

Examples of the compound having a hydroxyl group and an ether group include diethylene glycol mono(meth)acrylate, triethylene glycol mono(meth)acrylate, polyethylene glycol mono(meth)acrylate, dipropylene glycol mono (meth)acrylate, tripropylene glycol mono(meth)acrylate, polypropylene glycol mono(meth)acrylate, polytetramethylene glycol mono(meth)acrylate and others.

The amide group-containing compound includes, for example, acrylamide, methacrylamide, N,N-dimethylacrylamide, N,N-diethylacrylamide, N-isopropylacrylamide, N,N-dimethylaminopropylacrylamide, di-acetoneacrylamide and other (meth)acrylamide and their derivatives; vinylsulfonamide, vinylsulfanilide, vinyl sulfone methylanilide, vinyl sulfone acetanilide and other vinyl sulfoneamides. Preferred example of the polymerizable compound having an amide group includes (meth)acrylamide and an N-substituted (meth)acrylamide.

As the compound having an amino group, there may be mentioned, for instance, allylamine, diallylamine and other allyl compounds; 4-vinylaniline, N-vinyldiphenylamine and other vinyl compounds; N,N-dimethylaminoethyl (meth)acrylate, N,N-diethylaminoethyl (meth)acrylate and other (meth)acrylates.

Examples of the compound having an imide group include maleimide, an N-alkylmaleimide (e.g. N-methylmaleimide), N-phenylmaleimide, bismaleimide and other maleimide and their derivatives; N-vinylsuccinimide, N-vinylglutarimide, N-vinylphthalimide and other N-vinylpolycarboxylimide. The preferred polymerizable compound having an imide group includes maleimide and its derivatives.

The compound having a nitrile group includes, for instance, acrylonitrile, methacrylonitrile, 2-cyanoethyl (meth)acrylate and the like. Desirable polymerizable compound having a nitrile group includes (meth)acrylonitrile.

As examples of the compound having an isocyanate group, there may be mentioned vinyl isocyanate, methacryloyl isocyanate, m-(2-isocyano-2-propyl)-α-methylstyrene and so forth.

Examples of the compound having a cycloalkyl group or an aryl group include vinylcyclohexane, 2-vinyl-1-nonene, styrene, α-methylstyrene, p-chloromethylstyrene, p-methylstyrene, vinyltoluene, vinylnaphthalene, vinylanthracene and the like.

As examples of the compound having a heterocyclic group, there may be mentioned a compound having a nitrogen atom as a hetero atom, such as 2-vinylquinoline, 3-vinylpiperidine, 2-vinylpyrazine, 2-vinylpyridine, 4-vinylpyridine, N-vinylpyrrole, N-vinylindole, N-vinylcarbazole, N-vinylimidazole, N-vinyl-2-pyrrolidone, N-vinyl-ε-caprolactam and acryloylmorpholine. The polymerizable compound having a heterocyclic group also includes cyclic imino esters such as a compound having an oxazolone group (e.g. 2-vinyl-5-oxazolone, etc.) and cyclic imino ethers such as a compound having an oxazoline group (e.g. 2-vinyl-2-oxazoline). The preferred polymerizable compound having a heterocyclic group includes heterocyclic compounds each having a vinyl group bonded to the nitrogen atom as the hetero atom, and vinyl compounds each having a heterocyclic group having an oxygen atom in addition to the nitrogen atom as the hetero atoms, such as a cyclic imino ester group and cyclic imino ether group.

The preferable modifying group of the polymerizable compound includes, for instance, an epoxy group, a carboxyl group, an acid anhydride group, an ester group, a hydroxyl group, an amide group in which a modifying group may be bonded to the nitrogen atom, an amino group, a nitrile group, an isocyanate group, an imide group, and the above-mentioned heterocyclic group (e.g. a cyclic imino ester group, a cyclic imino ether group, etc.). The desirable amide group includes an N-substituted amide group having a non-self condensable modifying group bonded to the nitrogen atom.

In particular, preferred polymerizable compound includes (i) glycidyl (meth)acrylate and other ethylenically polymerizable compounds each containing an epoxy group, (ii) (meth)acrylic acid and other ethylenically polymerizable compounds each having a carboxyl group, (iii) maleic anhydride and other ethylenically polymerizable compounds each having an acid anhydride group, or (iv) ethylenically polymerizable compounds each having an amide bond and an epoxy group.

The ethylenically polymerizable compound having (i) an epoxy group or (iv) an amide bond and an epoxy group includes a compound shown by the following formula (3).

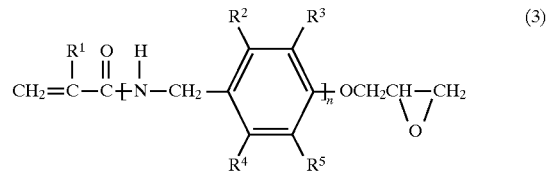

wherein $R^1$ represents a hydrogen atom or a methyl group, $R^2$ to $R^5$ independently represent a hydrogen atom, a halogen atom, an alkyl group, an alkoxy group, an alkoxycarbonyl group, an acyl group or an acyloxy group, and n denotes 0 or 1.

The halogen atom includes fluorine, chlorine, bromine and iodine atoms, and the alkyl group includes, for instance, methyl, ethyl, propyl, isopropyl, butyl, isobutyl, sec-butyl, t-butyl, pentyl, hexyl, octyl and other alkyl groups each having about 1 to 10 carbon atoms. The desirable alkyl group includes lower alkyl groups each having about 1 to 6 carbon atoms, in particular about 1 to 4 carbon atoms.

As the alkoxy group, there may be mentioned methoxy, ethoxy, propoxy, butoxy, t-butoxy, pentyloxy, hexyloxy and other lower alkoxy groups each having about 1 to 6 carbon atoms, typically speaking.

Examples of the alkoxycarbonyl group include methoxycarbonyl, ethoxycarbonyl, propoxycarbonyl, butoxycarbonyl, t-butoxycarbonyl, pentyloxycarbonyl, hexyloxycarbonyl and other lower alkoxycarbonyl groups each having about 1 to 6 carbon atoms in the alkoxy moiety.

The acyl group includes, for example, formyl, acetyl, propionyl, butyryl, valeryl, pivaloyl and other lower acyl groups each having about 1 to 6 carbon atoms. As examples of the acyloxy group, there may be mentioned acetyloxy, propionyloxy, butyryloxy, valeryloxy and pivaloyloxy groups.

$R^2$ to $R^5$ may practically be a hydrogen atom, a halogen atom or a lower alkyl group, respectively. In particular, $R^2$ to $R^5$ may practically be, the same or different, a hydrogen atom or a lower alkyl group. The typically preferred compound (3) includes a compound in which $R^1$ is a hydrogen atom or methyl group, and all of $R^2$ to $R^5$ are hydrogen atoms.

The compound in which n is 0 includes the glycidyl (meth)acrylate. As typical examples of the compound in which n is 1, there may be mentioned N-[4-(2,3-epoxypropoxy)phenylmethyl]acrylamide, N-[4-(2,3-epoxypropoxy)-3,5-dimethylbenzyl]acrylamide, N-[4-(2,3-epoxypropoxy)-3,5-diethylbenzyl]acrylamide, N-[4-(2,3-epoxypropoxy)-3,5-dibutylbenzyl]acrylamide and other N-[4-(2,3-epoxypropoxy)-3,5-dialkylbenzyl]acrylamide; N-[4-(2,3-epoxypropoxy)-2,6-dimethylbenzyl]acrylamide, N-[4-(2,3-epoxypropoxy)-2,5-dimethylbenzyl]acrylamide, N-[4-(2,3-epoxypropoxy)-2,3,5,6-tetramethylbenzyl]acrylamide and so forth.

The polymerizable compound may practically be in the liquid or solid form (non-gaseous form) at room temperature and at atmospheric pressure. Among these polymerizable compounds, compounds each having a boiling point at atmospheric pressure (ordinary pressure) of not lower than 70° C., preferably not lower than 100° C., and more preferably not lower than 120° C. may practically be used. The boiling point of the preferred polymerizable compound may practically be not lower than 140° C. at atmospheric pressure, such as in maleic anhydride, (meth)acrylic acid, glycidyl (meth)acrylate and the compound shown by the formula (3) (e.g. N-[4-(2,3-epoxypropoxy)-3,5-dimethylbenzyl]acrylamide).

The amount of the introduced modifying group may be selected from an optional range as far as improving affinities for polymers or additives, and is, for instance, about 0.1 to 30% by weight (e.g. about 0.1 to 20% by weight), preferably about 0.2 to 25% by weight (e.g. about 0.2 to 15% by weight), and more preferably about 0.3 to 20% by weight (e.g. about 0.3 to 10% by weight) in terms of the polymerizable compound relative to the base polyacetal. The modifying group may practically be introduced in a proportion of about 0.2 to 10% by weight as the polymerizable compound relative to the base polyacetal.

For the purpose of improving modification efficiency and utilization efficiency of the molded article, the modified polyacetal may preferably be a polyacetal modified by graft polymerization or addition polymerization of the polymerizable compound in the absence of (without coexistence of) a filler or reinforcing agent.

The bonding mode (bonding form) of the residue of the polymerizable compound (b) to the base polyacetal (A) as the base is not specifically limited. When the base polyacetal (A) is the polyacetal (1a), the residue of the polymerizable compound (B) may probably be introduced into the base polyacetal by graft polymerization. When the base polyacetal (A) is the polymerizable polyacetal, the residue of the polymerizable compound (B) may probably be introduced into the base polyacetal by addition-bonding.

The molecular weight of the modified polyacetal can be controlled or regulated within a comparatively wide range, and can be controlled to a comparatively high molecular weight which is not obtainable by a conventional modifying technology. In particular, the polymerizable polyacetal can advantageously be used as the base polyacetal for obtaining the modified polyacetal having a high molecular weight. Thus, the molecular weight (weight average molecular weight) of the modified polyacetal can be selected from a broad range, according to the use, of about 2,000 to 500,000, and practically about 2,000 to 400,000 (e.g. about 2,000 to 400,000) and preferably about 10,000 to 300,000.

[Production Method of Modified Polyacetal]

The modified polyacetal can be produced by allowing (A) the base polyacetal to react with (B) the polymerizable compound having the modifying group for the introduction of the residue of the polymerizable compound into the polyacetal. The base polyacetal (A) and the polymerizable compound (B) having the modifying group may be heated in the absence of (C) the free-radical initiator (polymerization initiator), but reaction of these compounds in the presence of the free-radical initiator (C) insures efficient introduction of the residue of the polymerizable compound. When a photopolymerization initiator (e.g. benzophenone or its derivative, a benzoin alkyl ether, benzyl, 2-chloroanthraquinone and other quinone derivatives) is used, the reaction may be carried out by light irradiation such as ultraviolet irradiation or a high-energy irradiation such as an electron beam. Modification by means of heating and hence reacting the compounds is desirable for an efficient reaction in a simple and easy manner.

The species of the free-radical initiator (C) is not strictly limited if only it is a compound having a function or role as a polymerization initiator which forms a free radical and initiates polymerization of the polymerizable compound. As the free-radical initiator, use can be made of organic peroxides and other peroxides, azo compounds and other free-radical polymerization initiators.

Examples of the peroxide include t-butyl hydroperoxide, p-menthane hydroperoxide, cumene hydro-peroxide, diisopropylbenzene hydroperoxide, 2,5-di-methylhexane-2,5-dihydroperoxide and other alkyl hydro-peroxides; di-t-butyl peroxide, t-butylcumyl peroxide, dicumyl peroxide, t-butyl peroxycumene, 2,5-dimethyl-2,5-di(t-butylperoxy)hexane, 2,5-dimethyl-2,5-di(t-butylperoxy)hexyne-3, $\alpha,\alpha'$-bis(t-butylperoxy-m-isopropyl)benzene and other dialkyl peroxides; benzoyl peroxide, lauroyl peroxide, p-chlorobenzoyl peroxide and other diacyl peroxides; methyl ethyl ketone peroxide, 1,1-bis(t-butylperoxy)-3,3,5-trimethylcyclohexane, 1,1-bis(t-butylperoxy)cyclododecane and other alkylidene peroxides; n-butyl-4,4-bis(t-butylperoxy)valerate, t-butyl peroxybanzoate and other ester peroxides and so on.

As the azo compound, there may be mentioned, for instance, 1-[(1-cyano-1-methylethyl)azo]formamide, 2,2'-azobis{2-methyl-N-[1,1-bis(hydroxymethyl)ethyl]propionamide} and other azoamide compounds; 1,1-azobis (cyclohexane-1-carbonitrile), 2-phenylazo-4-methoxy-2,4-dimethylvaleronitrile, 2,2'-azobis[2-(hydroxymethyl)-propionitrile], azobisisobutyronitrile and other azonitrile compounds; 2,2'-azobis(2,4,4-trimethylpentane) and other alkylazo compounds.

As other free-radical initiator, use may be made of, for example, potassium persulfate, sodium persulfate, ammonium persulfate and other persulfates.

These free-radical initiators may be used singly, or in combination with those of the same or different species.

For the purpose of introducing the modifying group of the polymerizable compound (B) into the polyacetal with a high efficiency, preferred free-radical initiator includes, a compound having a temperature of not lower than 130° C., preferably not lower than 150° C., and more preferably not lower than 160° C. at a half-life period of one minute. Such free-radical initiator (free-radical generator) may practically be an alkyl hydroperoxide, a dialkyl peroxide, an ester peroxide (in particular, an alkyl hydroperoxide or a dialkyl peroxide), and the azo compound. Examples of such radical initiator include α,α'-bis(t-butylperoxy-m-isopropyl) benzene, 2,5-di-methyl-2,5-di(t-butylperoxy)-hexyne-3, 2,5-dimethyl-2,5-di(t-butylperoxy)hexane, dicumyl peroxide, 2-phenylazo-4-methoxy-2,4-dimethylvaleronitrile, 2,2,2'-azobis(2,4, 4-trimethylpentane) and so forth.

The proportion of the polymerizable compound (B) having the modifying group can be selected within a range according to desired modification degree (reforming degree) and use or application of the modified polyacetal, and is about 0.1 to 30 parts by weight, preferably about 0.2 to 25 parts by weight (e.g. about 0.3 to 25 parts by weight), more preferably about 0.3 to 20 parts by weight (e.g. about 0.5 to 20 parts by weight) and practically about 1 to 20 parts by weight relative to 100 parts by weight of the base polyacetal (A), for instance. When the proportion of the polymerizable compound (B) is too small, modification degree of the base polyacetal is low, and when the proportion is excessively high, unreacted polymerizable compound (B) would remain, a homopolymer would form, or mechanical characteristics of the polyacetal may occasionally be sacrificed depending on the species of the polymerizable compound.

The relative proportion of the free-radical initiator (C) to the base polyacetal (A) may be selected within a range as far as inhibiting the base polyacetal from having an excessively low molecular weight and not deteriorating the modification efficiency, and is, relative to 100 parts by weight of the base polyacetal (A), not greater than 3.5 parts by weight (e.g. about 0.01 to 3.5 parts by weight), preferably about 0.01 to 3 parts by weight, and more preferably about 0.01 to 1.5 part by weight, for example. The free-radical initiator (C) may practically be used in an amount of about 0.05 to 0.5 part by weight relative to 100 parts by weight of the base polyacetal (A). The ratio of the free-radical initiator (C) relative to the total amount of the base polyacetal (A) and the polymerizable compound (B) can be selected from a range according to introduced amount of the modifying group, molecular weight of the modified polyacetal, half-life of the free-radical initiator at the treating temperature, amount of the polymerizable compound, treating temperature, treating period or other factors. The ratio of the free-radical initiator (C) is, for instance not greater than 2.5 parts by weight (e.g. about 0.01 to 2.5 parts by weight), preferably about 0.01 to 2 parts by weight, more preferably about 0.01 to 1 part by weight, and practically about 0.02 to 0.5 part by weight (e.g. about 0.05 to 0.5 part by weight) relative to 100 parts by weight of the total amount of the base polyacetal (A) and the polymerizable compound (B). When the amount of the free-radical initiator (C) is excessively small, the modification degree due to the polymerizable compound (B) is liable to be sacrificed, and when it is excessively large, the modification degree is not so improved. Depending on the species of the free-radical initiator, the base polyacetal may be excessively decomposed when the free-radical initiator (C) is used in an excess amount.

The relative proportion of the free-radical initiator (C) to 100 parts by weight of the polymerizable compound (B) may practically be about 0.1 to 25 parts by weight, preferably about 0.5 to 15 parts by weight, and more preferably about 1 to 10 parts by weight.

The method which insures modification of the base polyacetal (A) in a simple and easy manner includes a process which comprises mixing the base polyacetal (A) and the polymerizable compound (B) having the modifying group in a molten state of the base polyacetal (A) and in the presence of the free-radical initiator (C), in particular kneading the components in a molten state of the base polyacetal (melting-kneading method).

For the melting-mixing and melting-kneading treatments, conventional mixer and kneader, such as an extruder, Brabender, kneader, Bumbury's mixer, roll mill and so on can be employed. Preferred melting-mixer or kneader includes a closed apparatus such as an extruder and kneader. The kneading temperature may be selected within a range from the melting point to the decomposing point of the base polyacetal, and preferably the temperature is higher than the melting point of the base polyacetal by about 5 to 70° C. (preferably about 10° to 50° C.). The treating time (treating period) may be selected within the range according to the mixing or kneading temperature, and is, for instance, about 20 seconds to 2 hours, preferably about 30 seconds to 1 hour, and practically about 30 seconds to 30 minutes.

The melting-mixing or melting-kneading can be effected by, for example, feeding or supplying respectively the base polyacetal (A), the polymerizable compound (B), and if necessary, the free-radical initiator (C), in turn, to the mixer or kneader, or by feeding, beforehand, a mixture comprising the two components (A) and (B) or a mixture comprising the three components (A), (B) and (C) to the mixer or kneader. The melting-mixing or melting-kneading may also be carried out in the presence of an antioxidant.

Meanwhile, when the base polyacetal (A) and the free-radical initiator (C) are melting-mixed or melting-kneaded in the absence of the polymerizable compound (B), the molecular weight of the base polyacetal would be significantly decreased due to the free-radical initiator. To the contrary, the melting-mixing or melting-kneading of the base polyacetal (A) and the free-radical initiator (C) in the presence of the polymerizable compound (B) insures modification of the polyacetal by the polymerizable compound, and inhibits excessive decrease of the molecular weight of the base polyacetal, while depending on the amount of the free-radical initiator. Therefore, when the polymerizable compound (B) having the modifying group is added to a molten mixture comprising the base polyacetal (A) and the free-radical initiator (C), and the resultant mixture is mixed in a molten state of the base polyacetal, the modified polyacetal modified with the polymerizable compound and having a comparatively low molecular weight can be obtained. Such modified polyacetal can be used as a compatibilizing agent (compatibilizer), an adhesion improving agent for resins, metals, adhesives or paints (coatings).

In order to utilize the free-radical initiator effectively in the modification and to enhance the efficiency of modification due to the polymerizable compound with inhibiting decomposition of the base polyacetal, useful process is (i) a process which comprises mixing or kneading the three components of the base polyacetal (A), the polymerizable compound (B) having the modifying group and the free-radical initiator (C) in a molten state of the base polyacetal, (ii) a process which comprises adding the free-radical initiator (C) to a coexistent system of the base polyacetal (A) and the polymerizable compound (B), and mixing or kneading the resultant mixture in a molten state of the base polyacetal, (iii) a process which comprises adding the free-radical initiator (C) to a mixture, in particular a homogeneous mixture (preferably a compounded mixture or molten mixture) of the base polyacetal (A) and the polymerizable compound (B) having the modifying group, and mixing or kneading the resultant mixture in a molten state of the base polyacetal. According to these processes, the modifying group of the polymerizable compound can efficiently be introduced to the base polyacetal with retaining high molecular weight and excellent characteristics of the base polyacetal. In particular, the processes (ii) and (iii) can advantageously be employed for enhancing the modification efficiency with inhibiting decrease of the molecular weight of the base polyacetal (A), in comparison with the process (i), and they are effective to obtain a modified polyacetal having a high molecular weight. In especial, the use of the polymerizable polyacetal provides a modified polyacetal with a high molecular weight with ease.

Such process can be effected by feeding or supplying the three components or compound (compounded product) thereof to an apparatus or device such as the extruder, or melting and mixing the base polyacetal and the polymerizable compound in the apparatus and, thereafter, supplying or injecting the free-radical initiator into the apparatus, and mixing or kneading the resultant mixture. The process can also be carried out by feeding a mixture of the compound (compounded product) and the free-radical initiator to the apparatus and mixing or kneading the resultant mixture. The compound may practically be used in the form of a particle (powder or granular), or a pellet.

Further, the melting-mixing or melting-kneading may preferably be conducted in the absence of a reinforcing filler or other fillers for improving the modification degree due to the polymerizable compound and utilizing efficiency of the free-radical initiator. That is, when the melting-mixing or melting-kneading is conducted in the presence of a filler, control of the modification efficiency with respect to the base polyacetal and melt viscosity of the polymerizable compound can hardly be achieved in many cases. In contrast with this, modification in the absence of a filler and reinforcing agent insures effective utilization of the free-radical initiator and the polymerizable compound for the modification of the base polyacetal, and the combination use of the modified polyacetal and a variety of thermoplastic resin provides various compositions in a broad range, since the polyacetal is not modified with neither a filler or a reinforcing agent, which is generally employed in a comparatively large quantity.

In the formation reaction of the modified polyacetal, a product containing a part of a homopolymer of the polymerizable compound (B), or unreacted polymerizable compound (B) may occasionally be formed. The presence of the residual unreacted product or the homopolymer is, however, not so significant for practical use in many cases.

If necessary, a resin composition containing an additive, such as an antioxidant or other stabilizer can be subjected to the melting-mixing or melting-kneading process. For the purpose of enhancing or improving the modification efficiency of the base polyacetal due to the polymerizable compound, and utilizing efficiency of the free-radical initiator, the amount of the additive is preferably small, and is, for instance, not more than 10 parts by weight, preferably about 0.001 to 5 parts by weight, and more preferably about 0.01 to 3 parts by weight relative to 100 parts by weight of the total amount of the base polyacetal (polyacetal component) and the polymerizable compound.

Addition of the antioxidant as a stabilizer, among the additives, is useful for enhancing the stability of the modified polyacetal. The antioxidant includes, for instance, a hindered phenol, a hindered amine and other compounds. As the hindered phenol, there may be mentioned, for example, 2,6-di-t-butyl-p-cresol, 2,2'-methylenebis(4-methyl-6-t-butylphenol), 4,4'-methylenebis(2,6-di-t-butylphenol), 4,4'-butylidenebis(3-methyl-6-t-butylphenol), 1,6-hexanediol-bis[3-(3,5-di-t-butyl-4-hydroxyphenyl) propionate], pentaerythritoltetrakis[3-(3,5-di-t-butyl-4-hydroxyphenyl) propionate], triethylene glycol-bis[3-(3-t-butyl-5-methyl-4-hydroxyphenyl)propionate], 1,3,5-trimethyl-2,4,6-tris(3,5-di-t-butyl-4-hydroxybenzyl)benzene, n-octadecyl-3-(4',5'-di-t-butylphenol) propionate, stearyl-β-(3,5-di-t-butyl-4-hydroxyphenol) propionate, distearyl-3,5-di-t-butyl-4-hydroxybenzyl phosphonate, 2-t-butyl-6-(3-t-butyl-5-methyl-2-hydroxybenzyl-4-methylphenyl acrylate, N,N'-hexamethylenebis(3,5-di-t-butyl-4-hydroxy-hydrocinnamide), 3,9-bis{2-[3-(3-t-butyl-4-hydroxy-5-methylphenyl)propionyloxy]-1,1-dimethylethyl}-2,4,8,10-tetraoxaspiro[5,5]undecane, 4,4'-thiobis(3-methyl-6-t-butylphenol), 1,1,3-tris(2-methyl-4-hydroxy-5-t-butylphenol) butane and so on.

The hindered amine includes, for instance, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis (2,2,6,6-tetramethyl-4-piperidyl) adipate, bis(2,2,6,6-tetramethyl-4-piperidyl) sebacate, bis(1,2,2,6,6-pentamethyl-4-piperidyl) sebacate, bis-(1,2,2,6,6-pentamethyl-4-piperidyl) adipate, bis-(2,2,6,6-tetramethyl-4-piperidyl) terephthalate, 1,2-bis(2,2,6,6-tetramethyl-4-piperidyloxy)ethane, bis-(2,2,6,6-tetramethyl-4-piperidyl) hexamethylene-1,6-dicarbamate, tris(2,2,6,6-tetramethyl-4-piperidyl)benzene-1,3,5-tricarboxylate, phenyl-α-naphthylamine, phenyl-β-naphthylamine, N,N'-diphenyl-p-phenylenediamine, N-phenyl-N'-cyclohexyl-p-phenylenediamine, N-isopropyl-N'-phenyl-p-phenylenediamine and the like.

Examples of the other antioxidant include dimyristylthio dipropionate, dilaurylthio dipropionate, distearylthio dipropionate and other sulfur-containing antioxidants; trilsodecyl phosphate, triphenyl phosphite and other phosphorus-containing antioxidants; 2,5-die-t-butylhydroquinone, 2,5-diamylhydroquinone and other hydroquinone-series antioxidants; 6-ethoxy-2,2,4-trimethyl-1,2-dihydroquinoline and other quinoline-series antioxidants; and mercaptobenzoimidazole.

These antioxidants may be employed independently or in combination. Preferred antioxidant includes hindered phenols (phenolic antioxidants) and hindered amines (amine-series antioxidants).

When the modification is conducted in the presence of the antioxidant, the antioxidant may be added to the unmodified base polyacetal (A) or may be added in the modification process. Further, the antioxidant may be added to the modified polyacetal after completion of modification. The amount of the antioxidant is, relative to 100 parts by weight of the base polyacetal (A), about 0.001 to 2 parts by weight and preferably about 0.01 to 1 part by weight.

Furthermore, a variety of stabilizers for neutralizing or absorbing an acid or formaldehyde to be inactivated may be employed in a liberal combination. Such stabilizer includes, for instance, various polyamides, amidine compounds formed by dicyandiamide, melamine or their derivative, oxides or hydroxides of alkali metals or alkaline earth metals, and organic or inorganic salts. If required, a weather stabilizer (a light stabilizer) such as a benzotriazole and a benzophenone may also be used in combination. Preferred stabilizer system includes a stabilizer (stabilizing agent) comprising a combination of the antioxidant and the absorber for an acid and formaldehyde.

The modified polyacetal thus obtained may be pelletized where necessary.

Thermoplastic resin composition

The modified polyacetal used in the present invention has high affinities and miscibilities (compatibilities) for the thermoplastic resin (1), depending on the species or amount of the functional group of the polymerizable compound. Accordingly, the modified polyacetal (2) can liberally be used in combination with at least one species of (1) the thermoplastic resin in a variety of embodiments, and the resin composition comprising (1) the thermoplastic resin and (2) the modified polyacetal has excellent characteristics, in particular high weld strength and weld elongation.

First Embodiment

In the first embodiment of the present invention, the characteristics of the modified polyacetal are effectively imparted to the thermoplastic resin by using a single thermoplastic resin or plural thermoplastic resin which are miscible or compatible with each other. In this embodiment, the relative ratio of the (1) the thermoplastic resin to (2) the modified polyacetal may be selected from a range according to the modifying degree of the polyacetal, the species of the thermoplastic resin or other factors, and is, for example, such that the thermoplastic resin (1)/the modified polyacetal (2) equals about 1/99 to 99/1 (by weight), preferably about 5/95 to 95/5 (by weight) and more preferably about 10/90 to 90/10 (by weight).

The characteristics (properties) of the resin composition can easily be controlled or regulated according to the ratio of the thermoplastic resin (1) to the modified polyacetal (2), and the mechanical strength, slidability, heat resistance, chemical resistance and other characteristics can be improved, generally, with an increasing proportion of the modified polyacetal. More concretely, the combination use of (1) the olefinic polymer and (2) the modified polyacetal provides a composition having both of the characteristics of the olefinic polymer (e.g. light weight of the product) and the characteristics of the polyacetal (e.g. slidability, heat resistance, chemical resistance, etc.).

When (1) the acryl polymer and (2) the modified polyacetal are used in combination, a composition having both of the characteristics of the acrylic polymer (e.g. weather resistance or weather proof) and the characteristics of the polyacetal (e.g. slidability, heat resistance, chemical resistance, etc.) can be obtained.

The combination use of (1) the styrenic polymer and (2) the modified polyacetal insures a composition having the characteristics of the styrenic polymer (e.g. dimensional accuracy, coloring properties or staining properties) and the characteristics of the polyacetal (e.g. slidability, heat resistance, chemical resistance) in combination.

When (1) the polyester and (2) the modified polyacetal are employed in combination, a composition having both of the characteristics of the polyester (e.g. printing quality, coating quality, etc.) and the characteristics of the polyacetal (e.g. high slidability) can be produced and a mat or delustered molded article can be obtained.

The combination use of (1) the polyamide and (2) the modified polyacetal provides a composition possessing both of the characteristics of the polyamide (e.g. printing quality, coating quality, adhesion with respect to a metal, etc.) and the characteristics of the polyacetal (e.g. high slidability, poor water-absorptivity) in combination. In particular, such high adhesion with respect to a metal insures enhancement of drawing strength (removal strength) of a rod or bar in insert molding and improvement of adhesion (adhesive properties) with respect to a base material such as a base plate in outsert molding.

When (1) polyurethane and (2) the modified polyacetal are used in combination, a composition having both of the characteristics of the polyurethane (e.g. impact resistance, wear resistance or abrasion resistance) and the characteristics of the polyacetal (e.g. excellent chemical resistance) can be obtained.

The combination use of (1) the various elastomer (olefinic, diene-series, styrenic, acrylic, ester-series, amide-series, urethane-series, or other elastomer) and (2) the modified polyacetal insures enhancement of the impact resistance of the polyacetal, in particular impact resistance of a molded article having notches, and provides a composition having the characteristics of the polyacetal (e.g. slidability, heat resistance, chemical resistance, etc.).

Second Embodiment

In the second embodiment of the present invention, two or more species of the thermoplastic resins being immiscible (incompatible) with each other are chosen among the above thermoplastic resins according to the use of the product alloyed thermoplastic resin composition. This embodiment is, however, exclusive of a combination of a polyacetal, a thermoplastic resin except for a polyacetal, and a modified polyacetal (i.e. the third embodiment). The thermoplastic resins incompatible with each other may optionally be chosen and used in combination. As such combination, there may be mentioned, for example, (i) a combination of an olefinic polymer and at least one resin selected from the group consisting of a styrenic polymer, a polyester, a polyamide, a polycarbonate and a polyurethane, (ii) a combination of a styrenic polymer and at least one resin selected from the group consisting of a polyester, a polyamide, a polycarbonate and a polyurethane, (iii) a combination of a polyester and at least one resin selected from the group consisting of a polyamide, a polycarbonate and a polyurethane, (iv) a combination of a polyamide and a polycarbonate or a polyurethane, (v) a combination of a polycarbonate and a polyurethane, or other combinations. Incidentally, the thermoplastic resins being incompatible with each other may practically be resins differing in genus or group, such as a combination of the polyamide and the polyurethane, but they may be a combination of resins belonging to the same genus or group (e.g. a combination of an aliphatic polyester and an aromatic polyester).

The composition ratio of the plural thermoplastic resins incompatible with each other can be chosen from a wide range according to the desired or intended characteristics, and the ratio of each resin is about 5 to 95% by weight, preferably about 10 to 90% by weight, and more preferably about 25 to 75% by weight based on the total of the plural thermoplastic resins.

The combination use of the modified polyacetal and the plural thermoplastic resins incompatible with each other provides effective exhibition of the characteristics of each of the thermoplastic resins, and, in particular, provides a resin composition having high weld strength and weld elongation, and/or a resin composition having excellent impact resistance.

The proportion of (1) the plural thermoplastic resins incompatible with each other relative to (2) the modified polyacetal may be selected from a range according to the modifying degree of the polyacetal and the species of the thermoplastic resins, and is, for instance, such that (1) the plural thermoplastic resins (2) the modified polyacetal equals about 50/50 to 99/1 (by weight), preferably about 70/30 to 99/2 (by weight), and more preferably about 80/20 to 95/5 (by weight).

Third Embodiment

In the third embodiment of the present invention, (1a) the polyacetal and (1b) the thermoplastic resin except for a polyacetal are compounded and alloyed by (2) the modified polyacetal. By means of alloying with the polyacetal, the characteristics of the thermoplastic resin can effectively be presented. Further, since the modified polyacetal is incorporated into the resin composition, even a thermoplastic resin being incompatible with the polyacetal can be compounded with the polyacetal. Therefore, according to the present invention, a thermoplastic resin incompatible or immiscible with the polyacetal can also be employed advantageously.

The relative ratio of the polyacetal (1a) to the thermoplastic resin (1b) may be selected from a broad range depending on the species of the each component and the desired characteristics of the resin composition, and for example such that the polyacetal (1a)/the thermoplastic resin (1b) equals about 1/99 to 99/1 (by weight), preferably about 5/95 to 95/5 (by weight), and more about 10/90 to 90/10 (by weight). Even when the above ratio equals about 25/75 to 75/25 (by weight), the polyacetal and the thermoplastic resin can be compounded by means of the modified polyacetal, and hence the advantages of the polyacetal and the thermoplastic resin can be exhibited with effectiveness.

The modified polyacetal has excellent affinities and compatibilities (miscibilities) not only for the polyacetal (1a) but also for the thermoplastic resin (1b), according to the species and amount of the functional group of the polymerizable compound. Therefore, even when the resin composition comprises the polyacetal (1a) and the thermoplastic resin immiscible with respect to the polyacetal, the characteristics of the polyacetal (1a) and the thermoplastic resin (1b) exhibit effectively and hence a resin composition having high weld strength and weld elongation, or a resin composition excellent in impact resistance can be obtained, typically speaking.

The proportion of the modified polyacetal (2) can be selected, according to the species and ratios of the polyacetal (1a) and the thermoplastic resin (1b), from a range such that the total amount of the polyacetal (1a) and the thermoplastic resin (1b)/the modified polyacetal (2) equals about 50/50 to 99/1 (by weight), preferably about 70/30 to 99/1 (by weight) and more preferably about 80/20 to 97/3 (by weight).

The characteristics or properties of the resin composition can be regulated or adjusted according to the species and proportions of the polyacetal (1a), the thermoplastic resin (1b) and the modified polyacetal (2). More definitely, a combination use of the polyacetal (1a), the polyamide (1b) and the modified polyacetal (2) provides a resin composition having both of the characteristics of the polyamide (e.g. printing quality, coating quality, adhesive properties to a metal, etc.) and the characteristics of the polyacetal (e.g. high slidability and low water-absorptivity).

When the polyacetal (1a), the polyester (1b) and the modified polyacetal (2) are used in combination, a composition having both of the characteristics of the polyester (e.g. printing quality and coating quality) and the characteristics of the polyacetal (e.g. high slidability) can be provided, and a delustered molded article can be obtained.

The combination use of the polyacetal (1a), various elastomer (e.g. olefinic, diene-series, styrenic, acrylic, ester-series, amide-series or urethane-series elastomer) (1b), and the modified polyacetal (2) insures enhancement of the impact resistance of the polyacetal, in particular the impact resistance of a molded article having notches, and it provides a composition having the characteristics of the polyacetal (e.g. slidability, heat resistance, chemical resistance).

The third embodiment of the present invention also includes an embodiment of a combination of the polyacetal (1a), an elastomer (1e) as the thermoplastic resin and (2a) a modified polyacetal as produced by introducing an epoxy group into the base polyacetal, as the modified polyacetal. The resin composition of this embodiment is characterized in remarkable improvement of the impact resistance and mechanical characteristics.

The epoxy-modified polyacetal (2a) includes a modified polyacetal introduced with a residue of the polymerizable compound having an epoxy group (e.g. the polymerizable compound having a glycidyl group shown by the formula (3)) into the base polyacetal. Further, for the purpose of further improving the impact resistance and mechanical characteristics the use of an elastomer, as the elastomer (1e), having a functional group being reactive to an epoxy group is advantageous. The functional group just mentioned above includes not only a functional group having a free active hydrogen atom but also a precursor functional group which is capable of forming an active hydrogen atom (e.g. an acid anhydride group, a lower alkoxycarbonyl group or others when the functional group having an active hydrogen atom is a carboxyl group). The functional group reactive to an epoxy group includes, for instance, a carboxyl group or acid anhydride group, a hydroxyl group, a mercapto group, an amino group, an imino group, an amide group, a urethane bond, and a urea bond. The preferable elastomer may practically have a carboxyl group or acid anhydride group, a hydroxyl group, an amino group or a mercapto group, typically speaking. The functional group may be present in the terminal of the backbone chain or in the branched chain of the elastomer, or bonded to the backbone chain as suspended therefrom.

As the elastomer (1e), there may be mentioned, for instance, an olefinic elastomer, an acrylic elastomer, a styrenic elastomer, a polyester elastomer, a polyurethane elastomer, a polyamide elastomer and so forth. These elastomers may be used alone or in combination.

Examples of the olefinic elastomer include an ethylene-propylene copolymer, an ethylene-propylenediene copolymer, butyl rubber, an acrylonitrile-butadiene rubber, a polyolefin block copolymer, polyisoprene, polynorbornene rubber and others each of which has, for example, a carboxyl group, an acid anhydride group or amino group. Among them, an elastomer having a carboxyl group or acid anhydride group can advantageously be used as the olefinic elastomer.

As the acrylic elastomer, there may be mentioned, for instance, a copolymer derided from an alkyl acrylate such as methyl acrylate or butyl acrylate, a carboxyl group-containing monomer such as (meth)acrylic acid, and where necessary together with at least one of acrylonitrile or a chlorine-containing monomer, and an ethyleneacrylic rubber (i.e. a copolymer of ethylene, an alkyl acrylate including methyl acrylate, and when necessary together with a carboxyl group-containing monomer).

Examples of the styrenic elastomer include a styrene-butadiene rubber, an acrylonitrile-butadienestyrene rubber, a polymer as produced by grafting styrene and acrylonitrile to a rubber component such as butadiene, a polystyrene-polybutadiene-polystyrene (SBS) block copolymer, a polystyrene-polyisoprene-polystyrene (SIS) block copolymer, a polystyrene-poly(ethylene butylene)-polystyrene (SEBS) block copolymer and other tri-block copolymers, each of which has, for example, a carboxyl group, an acid anhydride group or an amino group. In particular, use can advantageously be made of an elastomer having a carboxyl group or an acid anhydride group as the styrenic elastomer.

As the polyester elastomer, there may be mentioned for example a polyester block copolymer, such as a block copolymer comprising poly(butylene terephthalate) or other poly(alkylene terephthalate) as a hard segment, and poly (tetramethylene glycol) unit, $\epsilon$-caprolactone unit or poly (butylene terephthalate adipate) unit as a soft segment. The polyurethane elastomer includes, for instance, a polyurethane as produced using a polyester diol or polyether diol as a diol component, and examples of the polyamide elastomer include a block copolymer comprising an aliphatic polyether as a soft segment (e.g. a block copolymer comprising nylon 12 as a hard segment, and a poly(alkylene glycol) as the soft segment) and so on.

In the thermoplastic resin composition comprising the polyacetal (1a), the elastomer (1e) and the epoxy-modified polyacetal (2a), the proportions of each components may be liberally selected from the above-specified range as far as not deteriorating the impact resistance and mechanical characteristics. The relative proportion of the polyacetal (1a) to the elastomer (1e) is, for example, such that the polyacetal (1a)/the elastomer (1e) equals about 50/50 to 99/1 (by weight), preferably about 55/45 to 98/2 (by weight), more preferably about 60/40 to 95/5 (by weight) and practically about 70/30 to 95/5 (by weight).

The ratio of the total amount of the polyacetal (1a) and the elastomer (1e) relative to the epoxy-modified polyacetal (2a) is, for instance, such that the total of the components (1a) and (1e)/the modified polyacetal (2a) equals about 70/30 to 99/1 (by weight), preferably about 75/25 to 95/5 (by weight) and more preferably about 75/25 to 90/10 (by weight).

Fourth Embodiment

The fourth embodiment of the present invention includes a resin composition comprising (I) a modified polymer composition containing (1c) a modified polymer except for a modified polyacetal, and (II) a modified polyacetal resin composition containing (2) a modified polyacetal.

Modified polymer composition (I)

The modified polymer composition (I) comprises at least (1c) a modified polymer except for the modified polyacetal (2), and the modified polymer (1c) may be obtainable by modification of a non-modified polymer (1d) except for the polyacetal (1a). The modified polymer composition (I) may be composed of the modified polymer (1c) and no other component, or may be composed of a combination of the modified polymer (1c) and the non-modified polymer (1d). Further, when the modified polymer (1c) and the non-modified polymer (1d) are used in combination, a combination of plural modified polymers (1c) and one or more of non-modified polymers (1d) may also be employed.

It should be understood that the term "the non-modified polymer (1d) corresponding to the modified polymer (1c)" means and includes not only a polymer (1d) having a backbone chain with the same or similar chemical structure of the modified polymer (1c) but also a non-modified polymer (1d) having excellent affinities for the modified polymer (1c) when the modified polymer (1c) has a backbone chain with different structure to the non-modified polymer.

Non-modified polymer (1d) and modified polymer (1c)

The non-modified polymer (1d) includes, among the thermoplastic resins as exemplified above, various thermoplastic resins which are not introduced with a functional group, such as olefinic polymers, diene polymers, acrylic polymers, styrenic polymers, poly(vinyl chloride) and other vinyl polymers, polyethers, poly(phenylene ether), polysulfone, poly(ether sulfone), poly(ether imide), poly (amide imide) and other thermoplastic resins.

As the preferred non-modified polymer (1d), there may be mentioned, for example, polyethylene, polypropylene, an ethylene-$\alpha$-olefin copolymer, an olefinic elastomer and other olefinic polymers; poly(methyl methacrylate) and other acrylic resins, an acrylic rubber and other acrylic polymers; polystyrene, a high impact polystyrene, an acrylonitrile-styrene copolymer, a styrene-acrylonitrile-butadiene copolymer, a styrenic block copolymer and other styrenic polymers; poly(vinyl chloride); poly(phenylene ether); polysulfone; poly(ether sulfone); poly(ether imide); poly (amide imide) and others.

The non-modified polymer (1d) can liberally be selected from the resins as exemplified in the explanation of the thermoplastic resin (1).

As the modified polymer (1c), there may be mentioned for instance various thermoplastic resins as produced by introducing, to the non-modified polymer (1d), a variety of functional group, such as an epoxy group, a carboxyl group, an acid anhydride group, an ester group, a hydroxyl group, an ether group, an amide group, an amino group, an imide group, an isocyanate group and a heterocyclic group having a nitrogen atom as a hetero atom, among functional groups to be introduced into the modified polyacetal (2). In the introduction of the functional group into the non-modified polymer (1d), a polymerizable compound having the same functional group as mentioned above, or a compound having a functional group corresponding to the reaction mode can be employed. The preferred functional group in the modified polymer (1c) includes the similar functional groups to the modified polyacetal (2), and, in particular, an epoxy group, a carboxyl group, an acid anhydride group and an amino group can advantageously be employed.

Examples of the modified polymer (1c) corresponding to or derived from the non-modified polymer (1d) are as follows:

The modified olefinic polymer includes, for example, copolymers as produced by using the $\alpha$-olefin, and if necessary the diene component, and a comonomeric component having a functional group including, for example, an $\alpha,\beta$-unsaturated carboxylic acid or its derivative (e.g. acrylic acid, methacrylic acid, their anhydrides, an alkyl (meth) acrylate, etc.), a polymerizable compound having an acid anhydride group (e.g. maleic anhydride), a polymerizable compound having a glycidyl group (e.g. glycidyl (meth) acrylate), a vinyl ester (e.g. vinyl acetate), a vinyl ether (e.g. vinyl methyl ether), derivatives of these vinyl compounds and the like.

In more detail, as examples of the modified olefinic polymer, there may be mentioned an ethylene-vinyl acetate copolymer and other ethylene-vinyl ester copolymers, a carboxyl-modified polyolefin (e.g. an ethylene(meth)acrylic acid copolymer, ionomers), an acid anhydride-modified polyolefin (e.g. a maleic anhydridemodified polyethylene, a maleic anhydride-modified polypropylene), a glycidyl-modified polyolefin (e.g. an ethylene-glycidyl (meth) acrylate copolymer), an ethylene-acrylic acid ester copolymer (e.g. an ethylene-ethyl acrylate copolymer) and so forth.

The modified diene series polymer includes, for instance, an acid anhydride-modified polybutadiene (e.g. a maleic anhydride-modified polybutadiene), a carboxyl-modified polybutadiene (e.g. (meth)acrylic acid-modified polybutadiene) and the like.

Examples of the modified styrenic polymer include a copolymer of the aromatic vinyl compound and an acrylic monomer and/or maleic anhydride or its derivative. As the acrylic monomer, there may be mentioned, for example, acrylic acid, methacrylic acid, methyl acrylate, methyl methacrylate and other (meth)acrylic acid esters. The maleic anhydride or its derivative includes, for instance, maleic anhydride, N-methylmaleimide, N-phenylmaleimide and so forth. In the copolymer, there is no particular limitation in the copolymerization mode such as random, block or graft polymerization, the polymerization degree, the presence or absence of a side chain or branch and its extent or degree, the composition ratio of the copolymerization, or other factors.

As the modified styrenic polymer, there may be mentioned, for example, a styrene-(meth)acrylic acid copolymer, a styrene-maleic anhydride copolymer, a styrene-methyl acrylate copolymer, a styrene-acrylonitrile-maleic anhydride copolymer, a styrene-acrylonitrile-butadiene-(meth)acrylic acid copolymer, a styrene-acrylonitrile-(meth)acrylic acid copolymer, a styrene-methyl methacrylate copolymer and so on. The preferable modified styrenic polymer includes a styrenemaleic anhydride copolymer, a styrene-acrylonitrile-maleic anhydride copolymer, a styrene-acrylonitrile-butadiene-(meth)acrylic acid copolymer, a styrene-acrylonitrile-(meth)acrylic acid copolymer and a styrene-methyl methacrylate copolymer, typically speaking.

Examples of the modified acrylic polymer include polymers each obtainable by introducing an acrylic acid or methacrylic acid unit into a homo- or co-polymer comprising an alkyl (meth)acrylate as a main component, such as a methyl methacrylate-(meth)acrylic acid copolymer, a methyl methacrylate-alkyl acrylate-(meth)acrylic acid copolymer, an alkyl acrylate-styrene-(meth)acrylic acid copolymer, a methyl methacrylate-glycidyl (meth)acrylate copolymer, a methyl methacrylate-2-hydroxyethyl (meth) acrylate copolymer, for instance.

The modified vinyl polymer includes, for example, a copolymer which is introduced with (meth)acrylic acid, maleic anhydride or others into the vinyl polymer, such as a vinyl acetate-(meth)acrylic acid copolymer, a vinyl ether-maleic anhydride copolymer and the like.

As the modified polyether, there may be mentioned, for instance, a polymer as formed by adding a polymerizable compound having a functional group, such as maleic anhydride, (meth)acrylic acid, glycidyl (meth)acrylate to the above-mentioned polyether, and if necessary adding a free-radical initiator, and heating the resultant mixture.

Examples of the other modified polymer include cellulose acetate and other cellulose esters, methyl cellulose, ethyl cellulose, carboxymethyl cellulose, hydroxymethyl cellulose and other cellulose ethers.

The preferred modified polymer (1c) includes, for example, polymers each modified with an epoxy group, a carboxyl group, an acid anhydride group, an amino group or others, such as an acid-modified polyolefin (e.g. a (meth) acrylic acid-modified polyethylene, a (meth)acrylic acid-modified polypropylene, a maleic anhydridemodified polyethylene, a maleic anhydride-modified polypropylene, etc.), a glycidyl-modified polyolefin (e.g. an ethylene-glycidyl (meth)acrylate copolymer) and other modified polyolefins, an acid-modified polystyrene (e.g. a styrene-maleic anhydride copolymer, a styrene-(meth)acrylic acid copolymer, etc.), an acid-modified acrylonitrile-styrene copolymer (e.g. an acrylonitrile-styrene-(meth)acrylic acid copolymer), a glycidyl-modified acrylonitrile-styrene-(meth)acrylic acid copolymer), an acid-modified ABS resin (e.g. an acrylonitrile-butadiene-styrene-(meth)acrylic acid copolymer), a glycidyl-modified polystyrene (e.g. a styrene-glycidyl (meth)acrylate copolymer), an acid-modified acrylic polymer (e.g. a methyl methacrylate-(meth)acrylic acid copolymer), a glycidyl-modified acrylic polymer (e.g. a methyl methacrylateglycidyl (meth)acrylate copolymer) and so forth.

The relative ratio of the modified polymer (1c) to the non-modified polymer (1d) in the modified polymer resin composition (I) may be selected according to the species of the modified polymer and intended use, and is, for example, such that the former (1c)/the latter (1d) equals about 100/0 to 1/99 (weight percent), preferably about 95/5 to 5/95 (weight percent), more preferably about 90/10 to 10/90 (weight percent) and practically about 20/80 to 80/20 (weight percent).

Modified polyacetal resin composition (II)

The modified polyacetal resin composition (II) may only comprise at least the modified polyacetal (2), and it may be composed of the modified polyacetal (2) and no other, or composed of a combination of the modified polyacetal (2) and the non-modified polyacetal (1a).

The proportion of the modified polyacetal (2) relative to the non-modified polyacetal (1a) in the modified polyacetal resin composition (II) may be selected according to the species of the modified polymer (1c) and the non-modified polymer (1d), the molecular weight of the modified polyacetal (2), and intended characteristics and use, and is, for instance, such that the former (2)/the latter (1a) equals about 100/0 to 1/99 (weight percent), preferably about 95/5 to 5/95 (weight percent), more preferably about 90/10 to 10/90 (weight percent) and practically about 20/80 to 80/20 (weight percent).

The combination use of the modified polyacetal (2) and the modified polymer (1c) insures effective alloying of the polyacetal (1a) even with the various non-modified polymer (1d) being immiscible with the polyacetal (1a). Therefore, according to the present invention, even when the non-modified polymer (1d) being incompatible or immiscible with the polyacetal is used, the characteristics of the polyacetal (1a) and the non-modified polymer (1d) exhibit effectively, and hence a composite resin composition having excellent mechanical characteristics, in particular, a composite resin composition having high weld strength and weld elongation, and a composite resin composition having excellent impact resistance can be obtained.

The relative proportion of the modified polymer composition (I) to the modified polyacetal resin composition (II) can be selected from a broad range depending on the species of the each component and the desired characteristics, and is, for instance such that the modified polymer composition (I)/the modified polyacetal resin composition (II) equals about 1/99 to 99/1 (by weight), preferably about 5/95 to 95/5 (by weight), and more preferably about 10/90 to 90/10 (by weight).

Other Embodiment

The modified polyacetal may be used in combination with other various resin, where necessary together with a polyacetal or other thermoplastic resins. By way of illustration, a resin composition comprising a combination of the modified polyacetal, at least one thermoplastic resin (e.g. a polyacetal) and a core-sheath polymer can be used advantageously. In particular, incorporation of the modified polyacetal into (i) a resin composition comprising a combination of the polyacetal and the core-sheath polymer, or (ii) a resin composition comprising a combination of the polyacetal, other thermoplastic resin and the core-sheath polymer insures enhancement of the impact resistance of the thermoplastic resin such as the polyacetal, in particular the impact resistance of a molded article formed with notches, and provides improvement of blow moldability, and further provides a mat or delustered molded article. The proportion of the at least one thermoplastic resin (e.g. a polyacetal) relative to the core-sheath polymer is such that, for instance, the thermoplastic resin/the core-sheath polymer equals about 99/1 to 60/40 (by weight), preferably about 95/5 to 60/40 (by weight) and practically about 90/10 to 70/30 (by weight).

The ratio of the modified polyacetal may be selected according to the species and proportions of the thermoplastic resin (e.g. a polyacetal) and the core-sheath polymer, and is, for example, such that the total amount of the thermoplastic resin and the core-sheath polymer/the modified polyacetal equals about 50/50 to 99/1 (by weight), preferably about 70/30 to 99/1 (by weight), more preferably about 80/20 to 97/3 (by weight). The ratio may practically be about 70/30 to 90/10 (by weight).

[Preparation process of the thermoplastic resin composition]

The thermoplastic resin composition of the present invention may be prepared according to various technologies, such as a process which comprises mixing (1) the thermoplastic resin and (2) the modified polyacetal in the form of particle (powder or granule), but the resin composition may practically be produced by mixing the components in the molten state or in a solution form.

When the mixing is conducted in the molten state of the component(s), conventional mixers or kneaders such as an extruder, Brabender, kneader, Bumbury's mixer, roll mill and so on can be employed. Preferred melting-mixer or kneader includes an closed apparatus such as an extruder or kneader.

The mixing temperature may adequately be selected in the range from an overlapped temperature range of from the lower limit of temperatures in which (1) the thermoplastic resin and (2) the modified polyacetal are capable of melting respectively (e.g. melting points) up to the decomposition temperatures thereof, and is, for instance, about 100° to 240° C., preferably about 130° to 230° C., and more preferably about 160° to 220° C.

When the modified polyacetal (2) is prepared by melting-mixing technology as mentioned above, the composition of the present invention comprising the thermoplastic resin (1) and the modified polyacetal (2) can also be prepared by incorporating the thermoplastic resin (1) into a melting and mixing system of the polyacetal and the polymerizable compound in coexistence.

The resin composition comprising the core-sheath polymer may be obtained by mixing the core-sheath polymer with the thermoplastic resin and the modified polyacetal at a temperature in which both of the thermoplastic resin and the modified polyacetal can be molten.

When mixing is conducted in a solution state, the object composition can be obtained by, for example, a process which comprises dissolving or dispersing the thermoplastic resin (1) and the modified polyacetal (2) in a solvent common to the both components, mixing the resultant solution or dispersion, and removing off the solvent by means of heating or under reduced pressure, a process which comprises adding the above solution or dispersion into a poor solvent with respect to both the resins to precipitate precipitation. The process in which mixing is conducted in the solution state is effective in case that the temperatures in which the thermoplastic resin (1) and the modified polyacetal (2) can be respectively molten are not overlapped, or such temperatures are greatly different each other.

Further, the modified polyacetal shows excellent affinities, compatibilities (miscibilities) and wett-abilities with respect to a reinforcing agent or filler (hereinafter generically referred to as "the filler", otherwise specifically referred to), according to the species and amount of the functional group of the polymerizable compound. Therefore, the resin composition further comprising the filler or others is also preferable in the present invention.

The filler includes organic or inorganic fillers, and the species thereof is not strictly limited. The filler may practically be a particulate (powdery or granular) or fibrous filler.

As examples of the particulate filler, there may be mentioned alumina, silica, kaolin, mica, clay, talc, glass (glass bead), zinc oxide, magnesium oxide, zirconium oxide, titanium oxide, aluminum hydroxide, calcium carbonate, magnesium carbonate, barium sulfate, potassium titanate, molybdenum disulfide, carbon, graphite, a powdery metal (e.g. an aluminum powder, a copper powder, etc.) and other inorganic particles, a fluororesin, polypropylene, polyamide, acrylic resin and other organic particles. The mean particle size (diameter) of the powdery or granular filler is, for instance, about 0.01 to 100 μm, preferably about 0.01 to 50 μm and more preferably about 0.01 to 10 μm.

As the fibrous filler, there may be mentioned for example organic fibers (e.g. polypropylene fiber, vinyl-on fiber, polyacrylonitrile fiber, polyamide fiber, aramide fiber, polyester fiber and so on), inorganic fibers (e.g. glass fiber, silica fiber, alumina fiber, zirconia fiber, carbon fiber, metal fiber, etc.), whiskers (e.g. whiskers of alumina, beryllium oxide, boron carbide, silicon carbide, silicon nitride or others). The fiber diameter of the fibrous filler is, for instance, about 0.1 to 200 μm, preferably about 0.1 to 150 μm, and more preferably about 0.1 to 100 μm. The fibrous filler may practically be used as a short staple with a fiber length of about 0.1 to 20 mm and preferably about 0.1 to 10 mm. The aspect ratio of the fibrous filler is about 5 to 1,000 and preferably about 10 to 500, for example.

These fillers may be used singly or in combination according to the intended use. By way of an example, glass fiber, carbon fiber or other fibrous fillers can be employed for enhancing rigidity (stiffness) and strength, a particulate filler can be used for improving rigidity and inhibiting warp. By the similar token, carbon fiber, molybdenum disulfide and other lubricative inorganic substances, and fluorine resin and other lubricative organic substances for enhancing wear resistance (abrasion resistance), carbon fiber, metal fiber or other electrically conductive fibers and carbon black or other electrically conductive powders or granules for improving electric conductivity, are respectively employed.

The relative ratio of the total amount of the thermoplastic resin (1) and the modified polyacetal (2) to the filler can be selected, according to the species of the reinforcing agent or filler, from a range not interfering with the characteristics of these additives such as moldability, and is, for instance, such that the total amount of the components (1) and (2)/the filler equals about 30/70 to 99.9/0.1 (by weight), preferably about 50/50 to 99.5/0.5 (by weight), more preferably about 70/30 to 99/1 (by weight) and practically about 70/30 to 95/5 (by weight).

Where necessary, the resin composition may contain an antioxidant, an ultraviolet absorber and other stabilizers, an antistatic, a lubricant, a flame-retarder, a coloring agent and other additives. The antioxidant may also be added to the modified polyacetal.

INDUSTRIAL APPLICABILITY

The resin composition of the present invention comprises a modified polyacetal introduced with a residue of a polymerizable compound, so that it insures impartment of the excellent characteristics of the polyacetal to the thermoplastic resin and effective alloying of two or more species of thermoplastic resins being immiscible with each other, and hence provides effective exhibition of the characteristics of the polyacetal and other thermoplastic resin. Use of an elastomer as the thermoplastic resin results in remarkable improvement of impact resistance (shock resistance) and other mechanical characteristics. Further, combination use of the thermoplastic resin, core-sheath polymer and modified polyacetal also insures an improved impact resistance. Moreover, since the resin composition comprises the modified polyacetal having excellent affinities for thermoplastic resins, reinforcing agents, fillers or others, a molded article having satisfactory mechanical characteristics, slidability, heat resistance, and, in particular, weld strength and weld elongation can be obtained. Furthermore, when the modified polyacetal modified in the absence of a reinforcing agent or filler is used, various resin compositions can efficiently be prepared, and hence the degree of freeness for the intended application can be enlarged.

Accordingly, the thermoplastic resin composition of the present invention is useful for obtaining a variety of molded or shaped articles by molding or processing. The molded article can be produced by a conventional technology such as injection molding, extrusion molding or others.

EXAMPLES

The following examples are intended to describe the present invention in more detail but should by no means limit the scope of the invention.
[Preparation of modified polyacetal]

Preparation Example 1
(preparation of Modified Polyacetal 1)

(A) A polyacetal [Polyplastics Co., Ltd., trade name DURACON M25, a polyacetal copolymer, melt flow rate 2.5 g/10 min. (190° C., 2.16 kg)] (95 parts by weight) was dry blended with 5 parts by weight (5.3 parts by weight relative to 100 parts by weight of the polyacetal) of (B) a polymerizable compound [N-[4-(2,3-epoxypropoxy)-3, 5-dimethylbenzyl]acrylamide (Kanegafuchi Chemical Industries, Ltd., trade name AXE)], and the resultant mixture was molten and kneaded with the use of a biaxial extruder at 190° C. for about 2 minutes to give a pellet. This pellet was dry blended with 0.1 part by weight (0.11 part by weight relative to 100 parts by weight of the polyacetal) of (C) a free-radical initiator [α,α'-bis(t-butylperoxy-m-isopropyl) benzene (Nippon Oil and Fats Co., Ltd., trade name PERBUTYL P)], and the resultant mixture was molten and kneaded with the aid of a biaxial extruder at a temperature of 190° C. for about 2 minutes to provide a pellet of a modified polyacetal.

The modification amount of the modified polyacetal due to the polymerizable compound was 1.9% by weight. The modification amount (modifying proportion) was determined in the following manner. That is, the modified polyacetal was purified by reprecipitation method for removing the component (B) which had not been bonded to the base polyacetal, and the amount of the component (B) introduced into the base polyacetal was determined by proton NMR and the modification amount due to the polymerizable compound was indicated in terms of % by weight as the proportion relative to the base polyacetal. Incidentally, the reprecipitation was conducted as follows. Namely, a solution of 150 mg of the modified polyacetal in 4 ml of hexafluoroisopropanol was added dropwise to a solvent for reprecipitation (acetone), and the precipitated polymer was recovered by filtration. By repeating this process three times or more, the modified polyacetal was purified.

Preparation Example 2
(preparation of Modified Polyacetal 2)

A modified polyacetal was obtained in the same manner as Preparation Example 1, except for using 90 parts by weight of the polyacetal (A) and 10 parts by weight of the polymerizable compound (B) [N-[4-(2,3-epoxypropoxy)-3, 5-dimethylbenzyl]acrylamide]. The modification amount of the modified polyacetal due to the polymerizable compound was 3.3% by weight.

Preparation Example 3
(preparation of Modified Polyacetal 3)

The procedure of Preparation Example 1 was repeated to give a modified polyacetal except that 5.3 parts by weight of a polymerizable compound [glycidyl methacrylate (Tokyo Chemical Industries, Ltd.)] relative to 100 parts by weight of the polyacetal was used. The modification amount of the modified polyacetal due to the polymerizable compound was 1.5% by weight. Incidentally, chloroform was used as the solvent for reprecipitation in the purification by means of reprecipitation.

Preparation Example 4
(preparation of Modified Polyacetal 4)

A modified polyacetal was obtained in the same manner as Preparation Example 1 except for employing 5.3 parts by weight of a polymerizable compound [maleic anhydride (Tokyo Chemical Industries, Ltd.)] relative to 100 parts by weight of the polyacetal. The modification amount of the modified polyacetal due to the polymerizable compound was 2.0% by weight. In the purification step by means of reprecipitation, chloroform was used as the solvent for reprecipitation.

Preparation Example 5
(preparation of Modified Polyacetal 5)

The procedure of Preparation Example 1 was repeated except that 5.3 parts by weight of a polymerizable compound [2-vinyl-2-oxazoline (as prepared according to the method described in Japanese Patent Application Laid-open No. 10773/1988 (JP-A-63-10773))] relative to 100 parts by weight of the polyacetal, and thereby a modified polyacetal was obtained. The modification amount due to the polymerizable compound was 1.3% by weight. In the purification step by means of reprecipitation, chloroform was used as the solvent for reprecipitation.

Preparation Example 6
(preparation of Modified Polyacetal 6)

To trioxane containing 2.5% by weight of 1,3-dioxolan and 0.8% by weight of allyl glycidyl ether was added boron trifluoride in a proportion of 40 ppm relative to the trioxane for cationic polymerization to provide a polymerizable polyacetal.

A modified polyacetal was obtained in the same manner as Preparation Example 1 except for using the above polymerizable polyacetal in lieu of the polyacetal used in Preparation Example 1. The modification amount due to the polymerizable compound was 3.0% by weight.

Preparation Example 7
(preparation of Modified Polyacetal 7)

To trioxane containing 2.5% by weight of 1,3-dioxolan and 0.1% by weight of divinylformal was added boron trifluoride in an amount of 40 ppm relative to trioxane for conducting cation polymerization, and thereby a polymerizable polyacetal was obtained.

A modified polyacetal was obtained in the same manner as Preparation Example 1 except for using the above polymerizable polyacetal in lieu of the polyacetal used in Preparation Example 1. The modifying amount due to the polymerizable compound was 2.2% by weight.

Preparation Example 8
(preparation of Modified Polyacetal 8)

To 500 parts by weight of cyclohexane containing 150 ppm of allyl alcohol as a chain transfer agent and $5.5 \times 10^{-4}$ mole/liter of dibutyltin dimethoxide as an anion polymerization catalyst was supplied a gaseous formaldehyde with a purity of 99.9% at a rate of 100 parts by weight per hour. Accompanied with the supply of the formaldehyde, cyclohexane containing the chain transfer agent and the anion polymerization catalyst in the same concentrations as above was fed to the reaction system at a rate of 500 parts by weight per hour. Thus, the polymerization was carried out at 55° C. for 3 hours, and the resultant polymer was separated from cyclohexane. The polymer was washed, dried and subjected to acetylation to give a polymerizable polyacetal.

By using this polymerizable polyacetal in lieu of the polyacetal used in Preparation Example 1, a modified polyacetal was obtained in the same manner as Preparation Example 1. The modification amount due to the polymerizable compound was 2.4% by weight.

Examples 1 to 11 and Comparative Examples 1 to 6

Modified Polyacetals 1 to 7 each obtained in the above preparation examples, and polyamide 12 ( Daicel-Huels Ltd., DAIAMID L1801) were dry blended in the proportions shown in Table 1. The resultant mixture was molten and kneaded with the use of a biaxial extruder at 190° C. to give pellets. These pellets were subjected to molding by means of an injection molding machine, and thereby a weld test piece (thickness 2 mm) having gates at the both ends was provided. The weld strength and weld elongation of the test piece were determined according to American Society for Testing Materials (ASTM) D638, and the results are set forth in Table 1. In Comparative Examples 1 to 6, Non-modified Polyacetal 1 [Polyplastics Co., Ltd., trade name DURACON M90, a polyacetal copolymer, melt flow rate 9 g/10 min. (190° C., 2.16 kg)] or Non-modified Polyacetal 2 [Asahi Chemical Industries Ltd., trade name TENAC 4010, a polyacetal homopolymer, melt flow rate 10 g/10 min. (190° C., 2.16 kg)] was used in lieu of the modified polyacetals. The results are shown in Table 1 and Table 2.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Polyamide 12 (part by weight) | 90 | 80 | 50 | 20 | 10 | 80 | 80 | 80 | 80 | 80 | 80 |
| Modified Polyacetal 1 (part by weight) | 10 | 20 | 50 | 80 | 90 | | | | | | |
| Modified Polyacetal 2 (part by weight) | | | | | | 20 | | | | | |
| Modified Polyacetal 3 (part by weight) | | | | | | | 20 | | | | |
| Modified Polyacetal 4 (part by weight) | | | | | | | | 20 | | | |
| Modified Polyacetal 5 (part by weight) | | | | | | | | | 20 | | |
| Modified Polyacetal 6 (part by weight) | | | | | | | | | | 20 | |
| Modified Polyacetal 7 (part by weight) | | | | | | | | | | | 20 |
| Weld strength (kg/cm$^2$) | 400 | 390 | 410 | 440 | 460 | 350 | 340 | 320 | 330 | 400 | 400 |
| Weld elongation (%) | 25 | 20 | 15 | 22 | 28 | 15 | 12 | 10 | 12 | 26 | 22 |

TABLE 2

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Polyamide 12 (part by weight) | 90 | 80 | 50 | 20 | 10 | 80 |
| Non-modified Polyacetal 1 (part by weight) | 10 | 20 | 50 | 80 | 90 | |
| Non-modified Polyacetal 2 (part by weight) | | | | | | 20 |
| Weld strength (kg/cm$^2$) | 220 | 180 | 120 | 150 | 300 | 190 |
| Weld elongation (%) | 5 | 3 | 2 | 2 | 6 | 3 |

As shown in Tables 1 and 2, the resin compositions according to the examples as produced using the modified polyacetals insure remarkable improvement in the weld strength and weld elongation in comparison with the resin compositions according to the comparative examples.

Examples 12 to 16 and Comparative Examples 7 to 11

A test piece was prepared in the same manner as Examples 1 to 11 except for using Modified Polyacetal 1 obtained in Preparation Example 1, and a polyester elastomer (Toray-Dupont Co., Ltd., Hytrel 4056) in proportions shown in Table 3. The weld strength and weld elongation of the test piece were determined to give the results shown in Table 3. In Comparative Examples 7 to 11, Non-modified Polyacetal 1 [Polyplastics Co., Ltd., trade name DURACON M90, a polyacetal copolymer] was used in lieu of the modified polyacetals. The results are set forth in Table 3.

12 (Daicel-Huels Ltd., DAIAMID L1801) and a polyurethane (a polyether series polyurethane as produced using 4,4'-methylenebis(phenylisocyanate) as a diisocyanate component, Nippon Miractran Co., Ltd.) in proportions set forth in Table 4, the resultant mixture was molten and kneaded with a biaxial extruder at 190° C. to give pellets. The pellets were molded with the use of an injection molding machine to provide a piece for weld test (thickness 2 mm) having gates at the both ends. The weld strength and weld elongation of the test piece were determined according to ASTM D638. The results are shown in Table 4 and Table 5.

As a comparison, the results obtained by using the non-modified polyacetal in lieu of the modified polyacetals are set forth in Table 5.

TABLE 3

|  | Example | | | | | Comparative Example | | | | |
| --- | --- | --- | --- | --- | --- | --- | --- | --- | --- | --- |
|  | 12 | 13 | 14 | 15 | 16 | 7 | 8 | 9 | 10 | 11 |
| Polyester Elastomer (part by weight) | 90 | 80 | 50 | 20 | 10 | 90 | 80 | 50 | 20 | 10 |
| Modified Polyacetal 1 (part by weight) | 10 | 20 | 50 | 80 | 90 |  |  |  |  |  |
| Non-modified Polyacetal 1 (part by weight) |  |  |  |  |  | 10 | 20 | 50 | 80 | 90 |
| Weld Strength (kg/cm$^2$) | 60 | 120 | 210 | 350 | 440 | 50 | 60 | 100 | 150 | 280 |
| Weld Elongation (%) | 45 | 30 | 15 | 16 | 20 | 10 | 8 | 3 | 5 | 6 |

As apparent from Table 3, when compared with resin compositions according to the comparative examples, the use of the resin compositions as produced employing the modified polyacetals results in enhanced weld strength and weld elongation.

Examples 17 to 28 and Comparative Examples 12 to 15

After dry blending Modified Polyacetals 1 to 8 each obtained in the above preparation examples with polyamide

TABLE 4

|  | Ex. 17 | Ex. 18 | Ex. 19 | Ex. 20 | Ex. 21 | Ex. 22 | Ex. 23 | Ex. 24 | Ex. 25 |
| --- | --- | --- | --- | --- | --- | --- | --- | --- | --- |
| Polyamide 12 (part by weight) | 80 | 75 | 70 | 60 | 60 | 70 | 70 | 70 | 70 |
| Polyurethane (part by weight) | 10 | 20 | 20 | 20 | 30 | 20 | 20 | 20 | 20 |
| Modified Polyacetal 1 (part by weight) | 10 | 5 | 10 | 20 | 10 |  |  |  |  |
| Modified Polyacetal 2 (part by weight) |  |  |  |  |  | 10 |  |  |  |
| Modified Polyacetal 3 (part by weight) |  |  |  |  |  |  | 10 |  |  |
| Modified Polyacetal 4 (part by weight) |  |  |  |  |  |  |  | 10 |  |
| Modified Polyacetal 5 (part by weight) |  |  |  |  |  |  |  |  | 10 |
| Weld strength (kg/cm$^2$) | 370 | 330 | 380 | 380 | 300 | 380 | 370 | 340 | 330 |
| Weld elongation (%) | 12 | 18 | 20 | 20 | 23 | 24 | 19 | 15 | 13 |

TABLE 5

|  | Ex. 26 | Ex. 27 | Ex. 28 | Com. Ex. 12 | Com. Ex. 13 | Com. Ex. 14 | Com. Ex. 15 |
|---|---|---|---|---|---|---|---|
| Polyamide 12 (part by weight) | 70 | 70 | 70 | 90 | 80 | 70 | 70 |
| Polyurethane (part by weight) | 20 | 20 | 20 | 10 | 20 | 30 | 20 |
| Modified Polyacetal 6 (part by weight) | 10 | | | | | | |
| Modified Polyacetal 7 (part by weight) | | 10 | | | | | |
| Modified Polyacetal 8 (part by weight) | | | 10 | | | | |
| Non-modified Polyacetal (part by weight) | | | | | | | 10 |
| Weld strength (kg/cm$^2$) | 380 | 380 | 380 | 240 | 230 | 120 | 140 |
| Weld elongation (%) | 24 | 22 | 22 | 5 | 7 | 9 | 8 |

As shown in Tables 4 and 5, the resin compositions according to the examples which comprise the modified polyacetals insure marked improvement of the weld strength and weld elongation as compared with the resin compositions each according to the comparative examples.

Examples 29 to 39 and Comparative Examples 16 to 19

A test piece for weld test was prepared in the same manner as Examples 17 to 28 except that Modified Polyacetals 1 to 8 each obtained in the preparation examples, a polyester [a poly(butylene terephthalate) resin having a low melting point to which 30 mole percent of isophthalic acid was copolymerized, intrinsic viscosity IV=0.5], and a thermoplastic polyurethane resin (Takeda-Verdishe Urethane Industries Ltd., XET880 D10) in proportions set forth in Tables 6 and 7. The weld strength and weld elongation of the test piece were determined, and the results are shown in Table 6 and Table 7.

As a comparison, the results of the test piece as produced by using the non-modified polyacetal instead of the mofified polyacetal are set forth in Table 7.

TABLE 6

|  | Ex. 29 | Ex. 30 | Ex. 31 | Ex. 32 | Ex. 33 | Ex. 34 | Ex. 35 | Ex. 36 |
|---|---|---|---|---|---|---|---|---|
| Polyester (part by weight) | 72 | 45 | 40 | 18 | 45 | 45 | 45 | 45 |
| Polyurethane (part by weight) | 18 | 45 | 40 | 72 | 45 | 45 | 45 | 45 |
| Modified Polyacetal 1 (part by weight) | 10 | 10 | 20 | 10 | | | | |
| Modified Polyacetal 2 (part by weight) | | | | | 10 | | | |
| Modified Polyacetal 3 (part by weight) | | | | | | 10 | | |
| Mddified Polyacetal 4 (part by weight) | | | | | | | 10 | |
| Modified Polyacetal 5 (part by weight) | | | | | | | | 10 |
| Weld strength (kg/cm$^2$) | 630 | 600 | 610 | 580 | 605 | 590 | 590 | 600 |
| Weld elongation (%) | 14 | 20 | 23 | 30 | 22 | 18 | 16 | 19 |

TABLE 7

|  | Ex. 37 | Ex. 38 | Ex. 39 | Comp. Ex. 16 | Comp. Ex. 17 | Com. Ex. 18 | Comp. Ex. 19 |
|---|---|---|---|---|---|---|---|
| Polyester (part by weight) | 45 | 45 | 45 | 80 | 50 | 20 | 45 |
| Polyurethane (part by weight) | 45 | 45 | 45 | 20 | 50 | 80 | 45 |
| Modified Polyacetal 6 (part by weight) | 10 | | | | | | |
| Modified Polyacetal 7 (part by weight) | | 10 | | | | | |
| Modified Polyacetal 8 (part by weight) | | | 10 | | | | |
| Nonmodified Polyacetal (part by weight) | | | | | | | 10 |
| Weld strength (kg/cm$^2$) | 600 | 600 | 600 | 200 | 100 | 310 | 130 |
| Weld elongation (%) | 22 | 21 | 21 | 5 | 3 | 10 | 2 |

As shown in Tables 6 and 7, the resin compositions comprising the modified polyacetal, each obtained in the examples, have enhanced weld strength and weld elongation when compared with the resin compositions each obtained in the comparative examples.

Examples 40 to 59 and Comparative Examples 20 to 24

Modified Polyacetals 1 to 8 each obtained in the preparation examples were respectively dry blended with a polyacetal (Polyplastics Co., Ltd., DURACON M90) and a polyamide 12 (Daicel-Huels Ltd., DAIAMID L1801) in proportions set forth in Table 8, and the resultant mixture was molten and kneaded by means of a biaxial extruder at 190° C. to give pellets. The pellets were molded with the use of an injection molding machine to provide a weld test piece (thickness 2 mm) having gates at both ends. The weld strength and weld elongation of the test piece were measured according to ASTM D638, and the results are set forth in Tables 8 to 10.

TABLE 8

|  | Ex. 40 | Ex. 41 | Ex. 42 | Ex. 43 | Ex. 44 | Ex. 45 | Ex. 46 | Ex. 47 |
|---|---|---|---|---|---|---|---|---|
| Polyacetal (part by weight) | 80 | 70 | 60 | 40 | 30 | 10 | 70 | 10 |
| Polyamide 12 (part by weight) | 10 | 20 | 20 | 50 | 50 | 80 | 20 | 80 |
| Modified Polyacetal 1 (part by weight) | 10 | 10 | 20 | 10 | 20 | 10 | | |
| Modified Polyacetal 2 (part by weight) | | | | | | | 10 | 10 |
| Weld strength (kg/cm$^2$) | 360 | 270 | 280 | 250 | 260 | 300 | 290 | 330 |
| Weld elongation (%) | 8 | 6.0 | 6.5 | 5.5 | 6.0 | 7.0 | 7.0 | 8.0 |

TABLE 9

|  | Ex. 48 | Ex. 49 | Ex. 50 | Ex. 51 | Ex. 52 | Ex. 53 | Ex. 54 | Ex. 55 |
|---|---|---|---|---|---|---|---|---|
| Polyacetal (part by weight) | 70 | 10 | 70 | 10 | 70 | 10 | 70 | 10 |
| Polyamide 12 (part by weight) | 20 | 80 | 20 | 80 | 20 | 80 | 20 | 80 |
| Modified Polyacetal 3 (part by weight) | 10 | 10 | | | | | | |
| Modified Polyacetal 4 (part by weight) | | | 10 | 10 | | | | |
| Modified Polyacetal 5 (part by weight) | | | | | 10 | 10 | | |
| Modified Polyacetal 6 (part by weight) | | | | | | | 10 | 10 |
| Weld strength (kg/cm$^2$) | 260 | 280 | 250 | 270 | 270 | 290 | 290 | 330 |
| Weld elongation (%) | 5.5 | 6.0 | 5.0 | 5.5 | 6.0 | 6.3 | 7.0 | 8.0 |

TABLE 10

|  | Ex. 56 | Ex. 57 | Ex. 58 | Ex. 59 | Comp. Ex. 20 | Comp. Ex. 21 | Comp. Ex. 22 | Comp. Ex. 23 | Comp. Ex. 24 |
| --- | --- | --- | --- | --- | --- | --- | --- | --- | --- |
| Polyacetal (part by weight) | 70 | 10 | 70 | 10 | 90 | 80 | 50 | 20 | 10 |
| Polyamide 12 (part by weight) | 20 | 80 | 20 | 80 | 10 | 20 | 50 | 80 | 90 |
| Modified Polyacetal 7 (part by weight) | 10 | 10 | | | | | | | |
| Modified Polyacetal 8 (part by weight) | | | 10 | 10 | | | | | |
| Weld strength (kg/cm$^2$) | 280 | 300 | 280 | 300 | 300 | 200 | 180 | 180 | 200 |
| Weld elongation (%) | 6.5 | 7.0 | 6.5 | 7.0 | 4 | 2 | 2 | 3 | 5 |

As apparent from Tables 8 to 10, the weld strength and weld elongation can remarkably be improved with the use of the resin compositions of the examples which comprise the modified polyacetal, as compared with the resin compositions according to the comparative examples.

Examples 60 to 71 and Comparative Examples 25 to 27

A weld test piece was prepared in the same manner as the above examples except for employing the modified polyacetals 1 to 8 obtained in the preparation examples, a polyacetal (Polyplastics Co., Ltd., DURACON M90), and an ether series polyurethane [a polyether series polyurethane manufactured by Nippon Miractran Co., Ltd. using 4,4'-methylenebis(phenylisocyanate) as a diisocyanate component) in proportions set forth in Table 11 and Table 12. The weld strength and weld elongation of the test piece were determined, and the results are shown in Tables 11 and 12.

TABLE 11

|  | Ex. 60 | Ex. 61 | Ex. 62 | Ex. 63 | Ex. 64 | Ex. 65 | Ex. 66 | Ex. 67 |
| --- | --- | --- | --- | --- | --- | --- | --- | --- |
| Polyacetal (part by weight) | 80 | 75 | 70 | 60 | 60 | 70 | 70 | 70 |
| Polyurethane (part by weight) | 10 | 20 | 20 | 20 | 30 | 20 | 20 | 20 |
| Modified Polyacetal 1 (part by weight) | 10 | 5 | 10 | 20 | 10 | | | |
| Modified Polyacetal 2 (part by weight) | | | | | | 10 | | |
| Modified Polyacetal 3 (part by weight) | | | | | | | 10 | |
| Modified Polyacetal 4 (part by weight) | | | | | | | | 10 |
| Weld strength (kg/cm$^2$) | 450 | 370 | 400 | 420 | 340 | 430 | 370 | 360 |
| Weld elongation (%) | 17 | 8 | 10 | 12 | 18 | 13 | 9 | 7 |

TABLE 12

|  | Ex. 68 | Ex. 69 | Ex. 70 | Ex. 71 | Comp. Ex. 25 | Comp. Ex. 26 | Comp. Ex. 27 |
| --- | --- | --- | --- | --- | --- | --- | --- |
| Polyacetal (part by weight) | 70 | 70 | 70 | 70 | 90 | 80 | 70 |
| Polyurethane (part by weight) | 20 | 20 | 20 | 20 | 10 | 20 | 30 |
| Modified Polyacetal 5 (part by weight) | 10 | | | | | | |
| Modified Polyacetal 6 (part by weight) | | 10 | | | | | |
| Modified Polyacetal 7 (part by weight) | | | 10 | | | | |
| Modified Polyacetal 8 (part by weight) | | | | 10 | | | |
| Weld strength (kg/cm$^2$) | 360 | 430 | 410 | 410 | 340 | 300 | 230 |
| Weld elongation (%) | 7 | 13 | 11 | 11 | 7 | 5 | 4 |

As apparent from Tables 11 and 12, the resin compositions comprising the modified polyacetal, according to the examples, have enhanced weld strength and weld elongation as compared with the resin compositions according to the comparative examples.

Examples 72 to 83 and Comparative Examples 28 to 30

By using Modified Polyacetals 1 to 8 each obtained in the preparation examples, a polyacetal (Polyplastics Co., Ltd., DURACON M90), and a polyester (a poly(butylene terephthalate) resin having a low melting point and comprising 30 mole percent of isophthalic acid as copolymerized, intrinsic viscosity IV=0.5) in proportions shown in Table 13 and Table 14, a test piece was prepared in the same manner as the above examples. Regarding the resin composition according to Comparative Example 30, it could not be extruded homogeneously by means of an extruder and hence failed to give a test piece. The weld strength and weld elongation of the obtained test pieces were measured. The results are shown in Tables 13 and 14.

Examples 84 to 87 and Comparative Examples 31 to 34

A test piece was prepared in the same manner as the above examples except for using Modified Polyacetal 1 obtained in the preparation example, a polyacetal (Polyplastics Co., Ltd., DURACON M90), and a polyester elastomer (Hoechst Celanese Co., Ltd., RIGHTFLEX 635) in proportions set forth in Table 15. The Izod impact strength, tensile strength and tensile elongation of the test piece were determined. The results are shown in Table 15.

TABLE 13

|  | Ex. 72 | Ex. 73 | Ex. 74 | Ex. 75 | Ex. 76 | Ex. 77 | Ex. 78 | Ex. 79 |
|---|---|---|---|---|---|---|---|---|
| Polyacetal (part by weight) | 80 | 75 | 70 | 60 | 60 | 70 | 70 | 70 |
| Polyester (part by weight) | 10 | 20 | 20 | 20 | 30 | 20 | 20 | 20 |
| Modified Polyacetal 1 (part by weight) | 10 | 5 | 10 | 20 | 10 | | | |
| Modified Polyacetal 2 (part by weight) | | | | | | 10 | | |
| Modified Polyacetal 3 (part by weight) | | | | | | | 10 | |
| Modified Polyacetal 4 (part by weight) | | | | | | | | 10 |
| Weld strength (kg/cm$^2$) | 570 | 545 | 550 | 560 | 495 | 560 | 540 | 540 |
| Weld elongation (%) | 10 | 7 | 8 | 11 | 7.5 | 11 | 7.5 | 6.5 |

TABLE 14

|  | Ex. 80 | Ex. 81 | Ex. 82 | Ex. 83 | Comp. Ex. 28 | Comp. Ex. 29 | Comp. Ex. 30 |
|---|---|---|---|---|---|---|---|
| Polyacetal (part by weight) | 70 | 70 | 70 | 70 | 90 | 80 | 70 |
| Polyester (part by weight) | 20 | 20 | 20 | 20 | 10 | 20 | 30 |
| Modified Polyacetal 5 (part by weight) | 10 | | | | | | |
| Modified Polyacetal 6 (part by weight) | | 10 | | | | | |
| Modified Polyacetal 7 (part by weight) | | | 10 | | | | |
| Modified Polyacetal 8 (part by weight) | | | | 10 | | | |
| Weld strength (kg/cm$^2$) | 540 | 560 | 545 | 545 | 540 | 520 | Not extrudable |
| Weld elongation (%) | 6.5 | 11 | 9 | 9 | 5 | 4 | |

The resin compositions according to the examples which comprise the modified polyacetal have improved weld strength and weld elongation when compared with the resin compositions according to the comparative examples, as shown in Tables 13 and 14.

TABLE 15

|  | Comp. Ex. 31 | Comp. Ex. 32 | Ex. 84 | Comp. Ex. 33 | Ex. 85 | Ex. 86 | Comp. Ex. 34 | Ex. 87 |
|---|---|---|---|---|---|---|---|---|
| Polyacetal (part by weight) | 100 | 90 | 70 | 80 | 60 | 70 | 70 | 50 |
| Modified Polyacetal 1 (part by weight) | 0 | 0 | 20 | 0 | 20 | 10 | 0 | 20 |
| Polyester Elastomer (part by weight) | 0 | 10 | 10 | 20 | 20 | 20 | 30 | 30 |

TABLE 15-continued

|  | Comp. Ex. 31 | Comp. Ex. 32 | Ex. 84 | Comp. Ex. 33 | Ex. 85 | Ex. 86 | Comp. Ex. 34 | Ex. 87 |
|---|---|---|---|---|---|---|---|---|
| Izod Impact Strength (kg · cm/cm) | 6.5 | 7.5 | 10.5 | 9 | 15 | 13 | 10.2 | 17 |
| Tensile Strength (kg/cm$^2$) | 620 | 500 | 540 | 416 | 425 | 420 | 400 | 410 |
| Tensile Elongation (%) | 60 | 70 | 130 | 90 | >200 | >200 | >200 | >200 |

Examples 88 to 91 and Comparative Examples 35 to 36

By using Modified Polyacetal 1 obtained in the above-mentioned preparation example, a polyacetal (Polyplastics Co., Ltd., DURACON M90), and a polyurethane elastomer (Nippon Miractran Co., Ltd., MIRACTRAN E180 MNAT) or a maleic anhydride-modified polyolefin series elastomer (Mitsui Petroleum Chemical Industries Ltd., N TAFMER MP0620) in proportions set forth in Table 16, a test piece was produced in the same manner as the above examples. The izod impact strength, tensile strength and tensile elongation of the test piece were determined, and the results are shown in Table 16.

tomer (Shell Chemical Industries Co., Ltd., KRATON FG 1901X) in proportions shown in Table 17. As to the test piece, the Izod impact strength, tensile strength and tensile elongation were determined, and the results are shown in Table 17.

Example 94 and Comparative Example 39

In order to exclude influence due to an emulsifier, an acrylic elastomer (Nippon Zeon Co., Ltd., Hitemp 4051) was cut into a piece in about 5 mm square, and subjected to reflux with water-methanol mixture (1/1 by volume) for 2 hours, washed with water and dried in vacuo at 100° C. for one day.

TABLE 16

|  | Ex. 88 | Ex. 89 | Comp. Ex. 35 | Ex. 90 | Ex. 91 | Comp. Ex. 36 |
|---|---|---|---|---|---|---|
| Polyacetal (part by weight) | 70 | 75 | 85 | 70 | 75 | 85 |
| Modified Polyacetal 1 (part by weight) | 15 | 10 | 0 | 15 | 10 | 0 |
| Polyurethane Elastomer (part by weight) | 15 | 15 | 15 | — | — | — |
| Polyolefin series Elastomer (part by weight) | — | — | — | 15 | 15 | 15 |
| Izod Impact Strength (kg · cm/cm) | 16 | 14 | 9.5 | 12 | 11 | 6 |
| Tensile Strength (kg/cm$^2$) | 436 | 433 | 430 | 390 | 389 | 378 |
| Tensile Elongation (%) | >200 | >200 | >200 | 128 | 118 | 60 |

Examples 92 to 93 and Comparative Examples 37 to 38

A test piece was prepared in the same manner as the above examples except for using Modified Polyacetal 1 obtained in the preparation example, a polyacetal (Polyplastics Co., Ltd., DURACON M90), and a polyamide elastomer (Daicel-Huels Ltd., DAIAMID E40) or a polystyrene series elas- By using Modified Polyacetal 1 obtained in the preparation example, a polyacetal (Polyplastics Co., Ltd., DURACON M90), and the acrylic elastomer in ratios set forth in the following table, a test piece was prepared in the same manner as the above examples. The Izod impact strength, tensile strength and tensile elongation of the test piece were measured. The results are shown in Table 17.

TABLE 17

|  | Ex. 92 | Comp. Ex. 37 | Ex. 93 | Comp. Ex. 38 | Ex. 94 | Comp. Ex. 39 |
|---|---|---|---|---|---|---|
| Polyacetal (part by weight) | 60 | 80 | 60 | 80 | 60 | 80 |
| Modified Polyacetal 1 (part by weight) | 20 | 0 | 20 | 0 | 20 | 0 |
| Polyamide Elastomer (part by weight) | 20 | 20 | 0 | 0 | 0 | 0 |
| Polystyrenic Elastomer (part by weight) | 0 | 0 | 20 | 20 | 0 | 0 |
| Acrylic Elastomer (part by weight) | 0 | 0 | 0 | 0 | 20 | 20 |

TABLE 17-continued

|  | Ex. 92 | Comp. Ex. 37 | Ex. 93 | Comp. Ex. 38 | Ex. 94 | Comp. Ex. 39 |
|---|---|---|---|---|---|---|
| Izod Impact Strength (kg · cm/cm) | 9.5 | 4.5 | 13 | 6.5 | 20 | 7 |
| Tensile Strength (kg/cm$^2$) | 485 | 420 | 400 | 390 | 380 | 360 |
| Tensile Elongation (%) | >200 | 69 | >200 | 70 | >200 | 71 |

As apparent from Tables 15 to 17, the combination use of the polyacetal, elastomer and epoxy-modified polyacetal insures remarkable improvement of the impact resistance and elongation.

Examples 95 to 105 and Comparative Examples 40, 41

Modified Polyacetals 1 to 4 obtained in the preparation examples, a polyacetal (Polyplastics Co., Ltd., DURACON M90), an acid anhydride-modified olefin elastomer (Mitsui Petroleum Chemical Industries Ltd., N-TAFMER MP0620) and an olefin elastomer (Mitsui Petroleum Chemical Industries Ltd., TAFMER P0680) were dry blended in proportions set forth in Table 18 and Table 19. The resultant mixture was molten and kneaded at 190° C. with the use of a biaxial extruder to give pellets. The pellets were molded with an injection molding machine to provide a weld test piece (thickness 2 mm) having gates at the both ends. The weld strength and weld elongation of the test piece were determined according to ASTM D638, and the results are set forth in Tables 18 and 19.

TABLE 18

|  | Ex. 95 | Ex. 96 | Ex. 97 | Ex. 98 | Ex. 99 | Ex. 100 | Ex. 101 |
|---|---|---|---|---|---|---|---|
| (2a-1) Modified Polyacetal 1 (weight %) | 12 | 6 | 12 | 24 | 12 | 12 | 24 |
| (2a-2) Modified Polyacetal 2 (weight %) |  |  |  |  |  |  |  |
| (2a-3) Modified Polyacetal 3 (weight %) |  |  |  |  |  |  |  |
| (2a-4) Modified Polyacetal 4 (weight %) |  |  |  |  |  |  |  |
| (2b) Nonmodified Polyacetal (weight %) | 88 | 94 | 88 | 76 | 88 | 88 | 76 |
| (II) Modified Polyacetal Composition (part by weight) | 95 | 85 | 85 | 85 | 70 | 85 | 85 |
| (1a) Acid Anhydride-Modified Olefin Elastomer (weight %) | 100 | 100 | 100 | 100 | 100 | 50 | 50 |
| (1b) Olefin Elastomer (weight %) |  |  |  |  |  | 50 | 50 |
| (I) Modified Polymer Composition (part by weight) | 5 | 15 | 15 | 15 | 30 | 15 | 15 |
| Weld strength (kg/cm$^2$) | 480 | 360 | 360 | 350 | 320 | 330 | 360 |
| Weld elongation (%) | 50 | 33 | 44 | 45 | 38 | 25 | 47 |

TABLE 19

|  | Ex. 102 | Ex. 103 | Ex. 104 | Ex. 105 | Comp. Ex. 40 | Comp. Ex. 41 |
|---|---|---|---|---|---|---|
| (2a-1) Modified Polyacetal 1 (weight %) | 24 | | | | | |
| (2a-2) Modified Polyacetal 2 (weight %) | | 12 | | | | |
| (2a-3) Modified Polyacetal 3 (weight %) | | | 12 | | | |
| (2a-4) Modified Polyacetal 4 (weight %) | | | | 12 | | |
| (2b) Nonmodified Polyacetal (weight %) | 76 | 88 | 88 | 88 | 100 | 100 |
| (II) Modified Polyacetal Composition (part by weight) | 85 | 85 | 85 | 85 | 85 | 85 |
| (1a) Acid Anhydride-Modified Olefin Elastomer (weight %) | 15 | 100 | 100 | 100 | | 100 |
| (1b) Olefin Elastomer (weight %) | 85 | | | | 100 | |
| (I) Modified Polymer Composition (part by weight) | 15 | 15 | 15 | 15 | 15 | 15 |
| Weld strength (kg/cm$^2$) | 330 | 360 | 350 | 340 | 220 | 280 |
| Weld elongation (%) | 26 | 46 | 42 | 40 | 5 | 7 |

As clearly shown in Tables 18 and 19, the use of the resin compositions according to the examples which comprise the modified polyacetals provides marked improvement of the weld strength and weld elongation, when compared with the resin compositions according to the comparative examples.

Examples 106 to 128 and Comparative Examples 42 to 45

A test piece was prepared in the same manner as the above examples except that Modified Polyacetals 1 to 8 obtained in the preparation examples, a polyacetal (Polyplastics Co., Ltd., DURACON M90), and an acid anhydride-modified low density polyethylene resin (Mitsui Petroleum Chemical Industries Ltd., N TAFMER TX-436) or an ethylene-glycidyl methacrylate copolymer (Sumitomo Chemical Industries Ltd., BONDFAST 2C), and a low density polyethylene resin (Nippon Petroleum Chemical Industiries Ltd., LEXLON W3300) were used in proportions indicated in Tables 20 to 23. The weld strength and weld elongation of the test piece were determined, and the results are set forth in Tables 20 to 23.

TABLE 20

|  | Ex. 106 | Ex. 107 | Ex. 108 | Ex. 109 | Ex. 110 | Ex. 111 | Ex. 112 | Ex. 113 |
|---|---|---|---|---|---|---|---|---|
| (2a-1) Modified Polyacetal 1 (weight %) | 5 | 15 | 15 | 30 | 30 | 30 | 30 | 30 |
| (2a-2) Modified Polyacetal 2 (weight %) | | | | | | | | |
| (2a-3) Modified Polyacetal 3 (weight %) | | | | | | | | |
| (2a-4) Modified Polyacetal 4 (weight %) | | | | | | | | |
| (2a-5) Modified Polyacetal 5 (weight %) | | | | | | | | |
| (2b) Nonmodified Polyacetal (weight %) | 95 | 85 | 85 | 70 | 70 | 70 | 70 | 70 |
| (II) Modified Polyacetal Composition (part by weight) | 90 | 90 | 80 | 80 | 80 | 80 | 50 | 20 |
| (1a-1) Acid Anhydride-Modified Low Density Polyethylene (weight %) | 100 | 100 | 100 | 100 | 50 | 30 | 30 | 30 |
| (1a-2) Ethylene-Glycidyl Meth-Acrylate Copolymer (weight %) | | | | | | | | |
| (1b) Low Density Polyethylene (weight %) | | | | | 50 | 70 | 70 | 70 |
| (I) Modified Polymer Composition (part by weight) | 10 | 10 | 20 | 20 | 20 | 20 | 50 | 80 |
| Weld strength (kg/cm$^2$) | 430 | 480 | 460 | 460 | 420 | 390 | 310 | 180 |
| Weld elongation (%) | 14 | 25 | 26 | 27 | 19 | 12 | 15 | 16 |

TABLE 21

|  | Ex. 114 | Ex. 115 | Ex. 116 | Ex. 117 | Ex. 118 | Ex. 119 | Ex. 120 | Ex. 121 |
|---|---|---|---|---|---|---|---|---|
| (2a-1) Modified Polyacetal 1 (weight %) | 50 | 100 | 100 | 100 |  |  |  |  |
| (2a-2) Modified Polyacetal 2 (weight %) |  |  |  |  | 30 |  |  |  |
| (2a-3) Modified Polyacetal 3 (weight %) |  |  |  |  |  | 30 |  |  |
| (2a-4) Modified Polyacetal 4 (weight %) |  |  |  |  |  |  | 30 |  |
| (2a-5) Modified Polyacetal 5 (weight %) |  |  |  |  |  |  |  | 30 |
| (2b) Nonmodified Polyacetal (weight %) | 50 |  |  |  | 70 | 70 | 70 | 70 |
| (II) Modified Polyacetal Composition (part by weight) | 20 | 20 | 20 | 10 | 80 | 80 | 80 | 80 |
| (1a-1) Acid Anhydride-Modified Low Density Polyethylene (weight %) | 30 | 30 | 15 | 15 | 100 | 100 | 100 |  |
| (1a-2) Ethylene-Glycidyl Meth-Acrylate Copolymer (weight %) |  |  |  |  |  |  |  | 100 |
| (1b) Low Density Polyethylene (weight %) | 70 | 70 | 85 | 85 |  |  |  |  |
| (I) Modified Polymer Composition (part by weight) | 80 | 80 | 80 | 90 | 20 | 20 | 20 | 20 |
| Weld strength (kg/cm$^2$) | 190 | 210 | 190 | 170 | 460 | 450 | 450 | 430 |
| Weld elongation (%) | 19 | 22 | 18 | 25 | 28 | 25 | 24 | 22 |

TABLE 22

|  | Ex. 122 | Ex. 123 | Ex. 124 |
|---|---|---|---|
| (2a-6) Modified Polyacetal 6 (weight %) | 30 |  |  |
| (2a-7) Modified Polyacetal 7 (weight %) |  | 30 |  |
| (2a-8) Modified Polyacetal 8 (weight %) |  |  | 30 |
| (2b) Non-modified Polyacetal (weight %) | 70 | 70 | 70 |
| (II) Modified Polyacetal Composition (part by weight) | 80 | 80 | 80 |
| (1a-1) Acid Anhydride-modified Low Density Polyethylene (weight %) | 100 | 100 | 100 |
| (I) Modified Polymer Composition (part by weight) | 20 | 20 | 20 |
| Weld Strength (kg/cm$^2$) | 470 | 465 | 465 |
| Weld Elongation (%) | 29 | 27 | 27 |

TABLE 23

|  | Ex. 125 | Ex. 126 | Ex. 127 | Ex. 128 | Comp. Ex. 42 | Comp. Ex. 43 | Comp. Ex. 44 | Comp. Ex. 45 |
|---|---|---|---|---|---|---|---|---|
| (2a-1) Modified Polyacetal 1 (weight %) |  |  |  |  |  |  |  |  |
| (2a-2) Modified Polyacetal 2 (weight %) | 100 |  |  |  |  |  |  |  |
| (2a-3) Modified Polyacetal 3 (weight %) |  | 100 |  |  |  |  |  |  |
| (2a-4) Modified Polyacetal 4 (weight %) |  |  | 100 |  |  |  |  |  |
| (2a-5) Modified Polyacetal 5 (weight %) |  |  |  | 100 |  |  |  |  |
| (2b) Nonmodified Polyacetal (weight %) |  |  |  |  | 100 | 100 | 100 | 100 |
| (II) Modified Polyacetal Composition (part by weight) | 20 | 20 | 20 | 20 | 80 | 50 | 20 | 80 |
| (1a-1) Acid Anhydride-Modified Low Density Polyethylene (weight %) | 30 | 30 | 30 |  |  |  |  | 100 |
| (1a-2) Ethylene-Glycidyl Meth-Acrylate Copolymer (weight %) |  |  |  | 30 |  |  |  |  |
| (1b) Low Density Polyethylene (weight %) | 70 | 70 | 70 | 70 | 100 | 100 | 100 |  |
| (I) Modified Polymer Composition (part by weight) | 80 | 80 | 80 | 80 | 20 | 50 | 80 | 20 |

TABLE 23-continued

|  | Ex. 125 | Ex. 126 | Ex. 127 | Ex. 128 | Comp. Ex. 42 | Comp. Ex. 43 | Comp. Ex. 44 | Comp. Ex. 45 |
|---|---|---|---|---|---|---|---|---|
| Weld strength (kg/cm$^2$) | 220 | 200 | 200 | 200 | 60 | 40 | 30 | 180 |
| Weld elongation (%) | 25 | 22 | 21 | 20 | 1 | 1 | 1 | 3 |

As apparent from Tables 20 to 23, the resin compositions comprising the modified polyacetals according to the examples show enhanced weld strength and weld elongation in comparison with the resin compositions according to the comparative examples.

Examples 129 to 146 and Comparative Examples 46 to 49

By using Modified Polyacetals 1 to 4 obtained in the preparation examples, a polyacetal (Polyplastics Co., Ltd., DURACON M90), an acid anhydride-modified polypropylene resin (Sanyo Chemical Industries Ltd., YUMEX 1001), and a polypropylene resin (Sumitomo Chemical Industries Ltd., NOBLEN D501) in proportions indicated in Tables 24 to 26, a test piece was prepared in the same manner as the above examples. The weld strength and weld elongation of the test piece were measured, and the results are shown in Tables 24 to 26.

TABLE 24

|  | Ex. 129 | Ex. 130 | Ex. 131 | Ex. 132 | Ex. 133 | Ex. 134 | Ex. 135 | Ex. 136 |
|---|---|---|---|---|---|---|---|---|
| (2a-1) Modified Polyacetal 1 (weight %) | 5 | 15 | 15 | 30 | 30 | 30 | 30 | 30 |
| (2a-2) Modified Polyacetal 2 (weight %) |  |  |  |  |  |  |  |  |
| (2a-3) Modified Polyacetal 3 (weight %) |  |  |  |  |  |  |  |  |
| (2a-4) Modified Polyacetal 4 (weight %) |  |  |  |  |  |  |  |  |
| (2b) Nonmodified Polyacetal (weight %) | 95 | 85 | 85 | 70 | 70 | 70 | 70 | 70 |
| (II) Modified Polyacetal Composition (part by weight) | 90 | 90 | 80 | 80 | 80 | 80 | 50 | 20 |
| (1a) Acid Anhydride-Modified Polypropylene (weight %) | 100 | 100 | 100 | 100 | 50 | 30 | 30 | 30 |
| (1b) Polypropylene (weight %) |  |  |  |  | 50 | 70 | 70 | 70 |
| (I) Modified Polymer Composition (part by weight) | 10 | 10 | 20 | 20 | 20 | 20 | 50 | 80 |
| Weld strength (kg/cm$^2$) | 330 | 360 | 250 | 250 | 240 | 240 | 220 | 245 |
| Weld elongation (%) | 7 | 8 | 6.5 | 6.5 | 6 | 6 | 5.5 | 9 |

TABLE 25

|  | Ex. 137 | Ex. 138 | Ex. 139 | Ex. 140 | Ex. 141 | Ex. 142 | Ex. 143 | Ex. 144 |
|---|---|---|---|---|---|---|---|---|
| (2a-1) Modified Polyacetal 1 (weight %) | 50 | 100 | 100 | 100 |  |  |  |  |
| (2a-2) Modified Polyacetal 2 (weight %) |  |  |  |  |  | 30 |  | 100 |
| (2a-3) Modified Polyacetal 3 (weight %) |  |  |  |  |  |  | 30 |  |
| (2a-4) Modified Polyacetal 4 (weight %) |  |  |  |  |  |  |  | 30 |
| (2b) Non-modified Polyacetal (weight %) | 50 |  |  |  | 70 | 70 | 70 |  |
| (II) Modified Polyacetal Composition (part by weight) | 20 | 20 | 20 | 10 | 80 | 80 | 80 | 20 |
| (1a) Acid Anhydride-Modified Polypropylene (weight %) | 30 | 30 | 15 | 15 | 100 | 100 | 100 | 30 |
| (1b) Polypropylene (weight %) | 70 | 70 | 85 | 85 |  |  |  | 70 |
| (I) Modified Polymer Composition (part by weight) | 80 | 80 | 80 | 90 | 20 | 20 | 20 | 80 |
| Weld strength (kg/m$^2$) | 250 | 260 | 250 | 250 | 270 | 250 | 220 | 280 |
| Weld elongation (%) | 9.5 | 10 | 9.5 | 9.5 | 8 | 6.5 | 5 | 12 |

TABLE 26

|  | Ex. 145 | Ex. 146 | Comp. Ex. 46 | Comp. Ex. 47 | Comp. Ex. 48 | Comp. Ex. 49 |
|---|---|---|---|---|---|---|
| (2a-1) Modified Polyacetal 1 (weight %) | | | | | | |
| (2a-2) Modified Polyacetal 2 (weight %) | | | | | | |
| (2a-3) Modified Polyacetal 3 (weight %) | 100 | | | | | |
| (2a-4) Modified Polyacetal 4 (weight %) | | 100 | | | | |
| (2b) Non-modified Polyacetal (weight %) | | | 100 | 100 | 100 | 100 |
| (II) Modified Polyacetal Composition (part by weight) | 20 | 20 | 80 | 50 | 20 | 80 |
| (1a) Acid Anhydride-Modified Polypropylene (weight %) | 30 | 30 | | | | 100 |
| (1b) Polypropylene (weight %) | 70 | 70 | 100 | 100 | 100 | |
| (I) Modified Polymer Composition (part by weight) | 80 | 80 | 20 | 50 | 80 | 20 |
| Weld strength (kg/cm$^2$) | 260 | 255 | not moldable | not moldable | 230 | 120 |
| Weld elongation (%) | 10 | 7 | | | 1 | 1 |

As shown in Tables 24 to 26, the resin compositions comprising the modified polyacetals according to the examples have enhanced weld strength and weld elongation when compared with the resin compositions according to the comparative examples.

Examples 147 to 164 and Comparative Examples 50 to 53

A test piece was prepared in the same manner as the above-mentioned examples except for employing Modified Polyacetals 1 to 4 obtained in the preparation examples, a polyacetal (Polyplastics Co., Ltd., DURACON M90), a styrene-maleic anhydride copolymer (Arco-Chemical Co., Ltd., DAILARK 250), and a high impact polystyrene resin (Daicel Chemical Industries Ltd., DAICEL STYROL HITS R80) in ratios indicated in Tables 27 to 29. The weld strength and weld elongation of the test piece were determined to give the results set forth in Tables 27 to 29.

TABLE 27

|  | Ex. 147 | Ex. 148 | Ex. 149 | Ex. 150 | Ex. 151 | Ex. 152 | Ex. 153 | Ex. 154 |
|---|---|---|---|---|---|---|---|---|
| (2a-1) Modified Polyacetal 1 (weight %) | 5 | 15 | 15 | 30 | 30 | 30 | 30 | 30 |
| (2a-2) Modified Polyacetal 2 (weight %) | | | | | | | | |
| (2a-3) Modified Polyacetal 3 (weight %) | | | | | | | | |
| (2a-4) Modified Polyacetal 4 (weight %) | | | | | | | | |
| (2b) Non-modified Polyacetal (weight %) | 95 | 85 | 85 | 70 | 70 | 70 | 70 | 70 |
| (II) Modified Polyacetal Composition (part by weight) | 90 | 90 | 80 | 80 | 80 | 80 | 50 | 20 |
| (1a) Styrene-Maleic Anhydride copolymer (weight %) | 100 | 100 | 100 | 100 | 50 | 30 | 30 | 30 |
| (1b) High-Impact Polystyrene (weight %) | | | | | 50 | 70 | 70 | 70 |
| (I) Modified Polymer Composition (part by weight) | 10 | 10 | 20 | 20 | 20 | 20 | 50 | 80 |
| Weld strength (kg/cm$^2$) | 430 | 480 | 450 | 460 | 440 | 400 | 430 | 280 |
| Weld elongation (%) | 6 | 10 | 7 | 8 | 6 | 5.5 | 5 | 6 |

TABLE 28

|  | Ex. 155 | Ex. 156 | Ex. 157 | Ex. 158 | Ex. 159 | Ex. 160 | Ex. 161 | Ex. 162 |
|---|---|---|---|---|---|---|---|---|
| (2a-1) Modified Polyacetal 1 (weight %) | 50 | 100 | 100 | 100 | | | | |
| (2a-2) Modified Polyacetal 2 (weight %) | | | | | 30 | | | 100 |
| (2a-3) Modified Polyacetal 3 (weight %) | | | | | | 30 | | |
| (2a-4) Modified Polyacetal 4 (weight %) | | | | | | | 30 | |
| (2b) Non-modified Polyacetal (weight %) | 50 | | | | 70 | 70 | 70 | |
| (II) Modified Polyacetal composition (part by weight) | 20 | 20 | 20 | 10 | 80 | 80 | 80 | 20 |
| (1a) Styrene-Maleic Anhydride copolymer (weight %) | 30 | 30 | 15 | 15 | 100 | 100 | 100 | 30 |
| (1b) High Impact Polystyrene (weight %) | 70 | 70 | 85 | 85 | | | | 70 |
| (I) Modified Polymer Composition (part by weight) | 80 | 80 | 80 | 90 | 20 | 20 | 20 | 80 |
| Weld strength (kg/cm$^2$) | 290 | 300 | 280 | 280 | 470 | 460 | 450 | 310 |
| Weld elongation (%) | 6.5 | 7 | 6 | 6 | 9 | 8 | 7 | 8 |

TABLE 29

|  | Ex. 163 | Ex. 164 | Comp. Ex. 50 | Comp. Ex. 51 | Comp. Ex. 52 | Comp. Ex. 53 |
|---|---|---|---|---|---|---|
| (2a-1) Modified Polyacetal 1 (weight %) | | | | | | |
| (2a-2) Modified Polyacetal 2 (weight %) | | | | | | |
| (2a-3) Modified Polyacetal 3 (weight %) | 100 | | | | | |
| (2a-4) Modified Polyacetal 4 (weight %) | | 100 | | | | |
| (2b) Non-modified Polyacetal (weight %) | | | 100 | 100 | 100 | 100 |
| (II) Modified Polyacetal Composition (part by weight) | 20 | 20 | 80 | 50 | 20 | 80 |
| (1a) Styrene Maleic Anhydride copolymer (weight %) | 30 | 30 | | | | 100 |
| (1b) High Impact Polystyrene (weight %) | 70 | 70 | 100 | 100 | 100 | |
| (I) Modified Polymer Composition (part by weight) | 80 | 80 | 20 | 50 | 80 | 20 |
| Weld strength (kg/cm$^2$) | 300 | 286 | not moldable | not moldable | not moldable | 190 |
| Weld elongation (%) | 7 | 6 | not moldable | not moldable | not moldable | 2 |

As apparent from Tables 27 to 29, the resin compositions as produced using the modified polyacetals according to the examples show enhanced weld strength and weld elongation in comparison with the resin compositions according to the comparative examples.

Examples 165 to 173 and Comparative Examples 54 to 56

By using Modified Polyacetals 1 to 4 obtained in the preparation examples, a polyacetal (Polyplastics Co., Ltd., DURACON M90), a modified acrylic resin (a methyl methacrylate-methacrylic acid copolymer as produced by radical polymerization of methyl methacrylate and methacrylic acid in a ratio of 95/5 (by weight), number average molecular weight $3 \times 10^4$), and an acrylic resin (Sumitomo Chemical Industries Ltd., SUMIBEX LG6) in proportions shown in Table 30 and Table 31, a test piece was prepared in the same manner as the above examples. The weld strength and weld elongation of the test piece were measured, and the results are shown in Tables 30 and 31.

TABLE 30

|  | Ex. 165 | Ex. 166 | Ex. 167 | Ex. 168 | Ex. 169 | Ex. 170 | Ex. 171 |
|---|---|---|---|---|---|---|---|
| (2a-1) Modified Polyacetal 1 (weight %) | 15 | 15 | 15 | 30 | 30 | 30 | |
| (2a-2) Modified Polyacetal 2 (weight %) | | | | | | | 15 |
| (2a-3) Modified Polyacetal 3 | | | | | | | |

TABLE 30-continued

|  | Ex. 165 | Ex. 166 | Ex. 167 | Ex. 168 | Ex. 169 | Ex. 170 | Ex. 171 |
|---|---|---|---|---|---|---|---|
| (weight %) | | | | | | | |
| (2a-4) Modified Polyacetal 4 (weight %) | | | | | | | |
| (2b) Non-modified Polyacetal (weight %) | 85 | 85 | 85 | 70 | 70 | 70 | 85 |
| (II) Modified Polyacetal Composition (part by weight) | 95 | 90 | 80 | 80 | 80 | 70 | 90 |
| (1a) Modified Acrylic Resin (weight %) | 100 | 100 | 50 | 50 | 30 | 50 | 100 |
| (1b) Acrylic Resin (weight %) | | | 50 | 50 | 70 | 50 | |
| (I) Modified Polymer Composition (part by weight) | 5 | 10 | 20 | 20 | 20 | 30 | 10 |
| Weld strength (kg/cm$^2$) | 500 | 470 | 460 | 480 | 460 | 440 | 500 |
| Weld elongation (%) | 10 | 8 | 7 | 8 | 7 | 6 | 10 |

TABLE 31

|  | Ex. 172 | Ex. 173 | Comp. Ex. 54 | Comp. Ex. 55 | Comp. Ex. 56 |
|---|---|---|---|---|---|
| (2a-1) Modified Polyacetal 1 (weight %) | | | | | |
| (2a-2) Modified Polyacetal 2 (weight %) | | | | | |
| (2a-3) Modified Polyacetal 3 (weight %) | 15 | | | | |
| (2a-4) Modified Polyacetal 4 (weight %) | | 15 | | | |
| (2b) Non-modified Polyacetal (weight %) | 85 | 85 | 100 | 100 | 100 |
| (II) Modified Polyacetal Composition (part by weight) | 90 | 90 | 90 | 80 | 90 |
| (1a) Modified Acrylic Resin (weight %) | 100 | 100 | | | 100 |
| (1b) Acrylic Resin (weight %) | | | 100 | 100 | |
| (I) Modified Polymer Composition (part by weight) | 10 | 10 | 10 | 20 | 10 |
| Weld strength (kg/cm$^2$) | 470 | 460 | 120 | not moldable | 180 |
| Weld elongation (%) | 8 | 7 | 1 | | 2 |

As shown in Tables 30 to 31, in comparison with the resin compositions according to the comparative examples, the resin compositions of the examples which comprise the modified polyacetals have higher weld strength and weld elongation. The resin composition according to Comparative Example 55 could not be mold, and hence the characteristics of the test piece could not be determined.

Examples 174 to 175 and Comparative Example 57

A test piece was prepared in the same manner as the above examples except for using Modified Polyacetal 1 obtained in the preparation example, a polyacetal (Polyplastics Co., Ltd., DURACON M90), an acid-modified styrene-acrylonitrile-butadiene copolymer (an acid-modified ABS resin) (Daicel Chemical Industries Ltd., ABS DPT651), and a styrene-acrylonitrile-butadiene copolymer (ABS resin) (Daicel Chemical Industries Ltd., ABS DPT611) in proportions set forth in Table 32. The weld strength, weld elongation, flexural strength (bending strength) and bending elastic modulus of the test piece were determined. The results are shown in Table 32.

TABLE 32

|  | Comp. Ex. 57 | Ex. 174 | Ex. 175 |
|---|---|---|---|
| (1a-1) Modified Polyacetal 1 (weight %) | 0 | 12.5 | 12.5 |
| (1b) Non-modified Polyacetal (weight %) | 100 | 87.5 | 87.5 |
| (I) Modified Polyacetal Composition (part by weight) | 80 | 80 | 80 |
| (2a) Acid-modified ABS Resin (weight %) | 0 | 25 | 50 |
| (2b) ABS Resin (weight %) | 100 | 75 | 50 |
| (II) Modified Polymer Composition (part by weight) | 20 | 20 | 20 |
| Bending Strength (kg/cm$^2$) | 679 | 700 | 720 |
| Bending Elastic modulus (kg/cm$^2$) | 19400 | 19900 | 20300 |
| Weld Strength (kg/cm$^2$) | 376 | 422 | 430 |
| Weld Elongation (%) | 2.9 | 4.5 | 6.5 |

As indicated in Table 32, the resin compositions according to the examples exhibit enhanced weld strength, weld elongation, bending strength and bending elastic modulus as compared with the resin composition of the comparative example.

[Preparation of Core-sheath Polymer]

Preparation Example 9

(preparation of Core-sheath Polymer A)

A 5-liter polymerization reactor with a reflux condenser was charged with 320 g of deionized water and 66 g of 10 weight percent aqueous solution of polyoxyethylene nonyl phenyl ether (Kao Co., Ltd., EMULGEN 950), and the charged was heated up to 70° C. with stirring under a nitrogen gas stream. To the charged was added 77 g of the first-step monomer mixture having the following composition, and the mixture was dispersed for 10 minutes. To the resultant dispersion was added 154 g of a 2 weight % aqueous solution of 2,2-azobis(2-aminopropane) dihydrochloride (Wako Pure Chemical Industries Ltd., V-50) and polymerization was conducted to produce a seed particle.

| [Composition of the first-step monomer mixture] | |
| --- | --- |
| n-Butyl acrylate | 1533.84 g |
| Allyl methacrylate | 3.08 g |
| 1,4-Butylene glycol methacrylate | 3.08 g |

1,4-Butylene glycol methacrylate 3.08 g

To the reaction mixture was continously fed, for 180 minutes, an emulstion as prepared by adding 440 g of a 10 weight % aqeuous solution of polyoxyethylene nonyl phenyl ether (Kao Co., Ltd., EMULGEN 950) and 440 g of a deionized water to the rest of the first-step monomer mixture (1463 g) to carry out polymerization.

After aging the reaction mixture at 70° C. for 1 hour, the second-step polymerization was conducted. That is, 66 g of a 2 weight % aqueous solution of 2,2-azobis(2-aminopropane) dihydrocyloride (Wako Pure Chemical Industries Ltd., V-50) was added to the reaction mixture and to the resultant was continuously fed 1120 g of the second-step monomer emulsion of the following composition for 60 minutes for seed polymerization.

| [Composition of the second-step monomer emulsion] | |
| --- | --- |
| Methyl methacrylate | 594.0 g |
| Ethyl acrylate | 66.0 g |
| Polyoxyethylene nonyl phenyl ether (EMULGEN 950) | 220.0 g |
| Deionized water | 440.0 g |

After the reaction temperature was raised up to 80° C. and the reaction mixture was subjected to aging for 1 hour, the resultant was cooled, filtrated with the use of a stainless steel mesh of 300 mesh to give a core-sheath polymer latex. This latex was freezed at −15° C., filtrated with a glass filter and air dried at 60° C. for one day to provide Core-sheath Polymer A.

Preparation Examples 10 to 14
(Core-sheath Polymers B to F)

Core-sheath Polymers B to F were obtained in the same manner as Preparation Example 9 in the monomer compositions shown in Table 33. Incidentally, concerning Core-sheath Polymer C, the obtained polymer was heated with the use of a biaxial extruder at a cylinder temperature of 220° C. and a die head temperature of 230° C. under reduced pressure to provide a core-sheath polymer which was introduced with an acid anhydride group by means of dehydration of a dicarboxylic acid, and the resultant core-sheath polymer was used in the preparation of the undermentioned polyacetal resin compositions.

The abbreviations of the monomers in Table 33 indicate respectively the following monomers.

BA: n-butyl acrylate

AlMA: allyl methacrylate

BGM: 1,4-butylene glycol diacrylate

MMA: methyl methacrylate

EA: ethyl acrylate

MAA: methacrylic acid

IA: itaconic acid

GMA: glycidyl methacrylate

HEMA: 2-hydroxyethyl methacrylate

MAM: methacrylic amide

TABLE 33

| Core-sheath Polymer | A | B | C | D | E | F |
| --- | --- | --- | --- | --- | --- | --- |
| Core phase/Sheath phase (by weight) | 70/30 | 70/30 | 70/30 | 70/30 | 70/30 | 70/30 |
| Core Phase (first-step) Monomer Composition | | | | | | |
| BA (part by weight) | 69.72 | 69.72 | 69.72 | 69.72 | 69.72 | 69.72 |
| AlMA (part by weight) | 0.14 | 0.14 | 0.14 | 0.14 | 0.14 | 0.14 |
| BGA (part by weight) | 0.14 | 0.14 | 0.14 | 0.14 | 0.14 | 0.14 |
| Sheath Phase (second-step) Monomer Composition | | | | | | |
| MMA (part by weight) | 27.0 | 24.0 | 24..0 | 24.0 | 24.0 | 24.0 |
| EA (part by weight) | 3.0 | 3.0 | 3.0 | 3.0 | 3.0 | 3.0 |
| MAA (part by weight) | | 3.0 | | | | |
| IA (part by weight) | | | 3.0 | | | |
| GMA (part by weight) | | | | 3.0 | | |
| HEMA (part by weight) | | | | | 3.0 | |
| MAM (part by weight) | | | | | | 3.0 |

Examples 176 to 181 and Comparative Example 58, 59

Modified Polyacetals 1, 3 to 6 and Core-sheath Polymers A and B each obtained in the above preparation examples were dry blended with a polyacetal (Poly-plastics Co., Ltd., DURACON M90) in propositions set forth in Table 34, and the resultant mixture was molten and kneaded at 190° C. with the use of a biaxial extruder to give pellets. The pellets were molded by means of an injection molding machine to provide a test piece for impact test, and a weld test piece having gates at the both ends. The Izod impact strength thereof was measured according to ASTM D256, and the weld strength and weld elongation of the test piece were determined according to ASTM D638. The results are shown in Table 34.

TABLE 34

| | Ex. 176 | Ex. 177 | Ex. 178 | Ex. 179 | Ex. 180 | Ex. 181 | Comp. Ex.58 | Comp. Ex. 59 |
| --- | --- | --- | --- | --- | --- | --- | --- | --- |
| Polyacetal (part by weight) | 60 | 60 | 60 | 60 | 60 | 60 | 80 | 80 |
| Core-sheath Polymer A (part by weight) | 20 | — | — | — | — | — | 20 | — |
| Core-sheath Polymer B (part by weight) | — | 20 | 20 | 20 | 20 | 20 | — | 20 |
| Modified Polyacetal 1 (part by weight) | 20 | 20 | — | — | — | — | — | — |
| Modified Polyacetal 3 | — | — | 20 | — | — | — | — | — |

TABLE 34-continued

|  | Ex. 176 | Ex. 177 | Ex. 178 | Ex. 179 | Ex. 180 | Ex. 181 | Comp. Ex. 58 | Comp. Ex. 59 |
|---|---|---|---|---|---|---|---|---|
| (part by weight) |  |  |  |  |  |  |  |  |
| Modified Polyacetal 4 (part by weight) | — | — | — | 20 | — | — | — | — |
| Modified Polyacetal 5 (part by weight) | — | — | — | — | 20 | — | — | — |
| Modified Polyacetal 6 | — | — | — | — | — | 20 | — | — |
| Izod Impact Strength (kg · cm/cm) | 12 | 21 | 20 | 15 | 17 | 25 | 9 | 9.5 |
| Weld Tensile Strength (kg · cm$^2$) | 330 | 350 | 350 | 335 | 335 | 360 | 305 | 310 |
| Weld Tensile Elongation (%) | 24 | 33 | 32 | 26 | 28 | 48 | 6 | 7 |

As indicated in Table 34, the use of the resin compositions according to the examples which comprise the modified polyacetals insures remarkable improvement of the impact strength, weld strength and weld elongation when compared with the resin compositions according to the comparative examples.

Examples 182 to 186 and Comparative Examples 60, 61

By using Modified Polyacetal 1 and Core-sheath Polymer B each obtained in the preparation examples, and a polyacetal (Polyplastics Co., Ltd., DURACON M90) in proportions as set forth in Table 35, test pieces were produced in the same manner as the above examples. The Izod impact strength, weld strength and weld elongation of the test pieces were determined to give the results shown in Table 35.

Examples 187 to 190 and Comparative Examples 62 to 65

Test pieces were prepared in the same manner as the above examples except for employing Modified Polyacetals 1, 4 and 6 and Core-sheath Polymer C to F each obtained in the preparation examples, and a polyacetal (Polyplastics Co., Ltd., DURACON M90) in ratios set forth in Table 36. The Izod impact strength, weld strength and weld elongation

TABLE 35

|  | Ex. 182 | Ex. 177 | Ex. 183 | Ex. 184 | Ex. 185 | Ex. 186 | Comp. Ex. 60 | Comp. Ex. 59 | Comp. Ex. 61 |
|---|---|---|---|---|---|---|---|---|---|
| Polyacetal (part by weight) | 70 | 60 | 55 | 75 | 70 | 65 | 90 | 80 | 75 |
| Core-sheath Polymer B (part by weight) | 10 | 20 | 25 | 20 | 20 | 20 | 10 | 20 | 25 |
| Modified Polyacetal 1 (part by weight) | 20 | 20 | 20 | 5 | 10 | 15 | — | — | — |
| Izod Impact Strength (kg · cm/cm) | 15 | 21 | 23 | 13 | 17 | 20 | 8 | 9.5 | 10 |
| Weld Tensile Strength (kg · cm$^2$) | 370 | 350 | 340 | 335 | 340 | 345 | 330 | 310 | 305 |
| Weld Tensile Elongation (%) | 36 | 33 | 32 | 28 | 30 | 32 | 9 | 7 | 6.5 |

It is apparent from Table 35 that the resin compositions of the examples which comprise the modified polyacetals show of the test pieces were measured, and the results are shown in Table 36.

TABLE 36

|  | Ex. 187 | Ex. 188 | Ex. 189 | Ex. 190 | Comp. Ex. 62 | Comp. Ex. 63 | Comp. Ex. 64 | Comp. Ex. 65 |
|---|---|---|---|---|---|---|---|---|
| Polyacetal (part by weight) | 60 | 60 | 69 | 60 | 80 | 80 | 80 | 80 |
| Core-sheath Polymer C (part by weight) | 20 | — | — | — | 20 | — | — | — |
| Core-sheath Polymer D (part by weight) | — | 20 | — | — | — | 20 | — | — |
| Core-sheath Polymer E (part by weight) | — | — | 20 | — | — | — | 20 | — |

TABLE 36-continued

|  | Ex. 187 | Ex. 188 | Ex. 189 | Ex. 190 | Comp. Ex. 62 | Comp. Ex. 63 | Comp. Ex. 64 | Comp. Ex. 65 |
|---|---|---|---|---|---|---|---|---|
| Core-sheath Polymer F (part by weight) | — | — | — | 20 | — | — | — | 20 |
| Modified Polyacetal 1 (part by weight) | 20 | — | — | — | — | — | — | — |
| Modified Polyacetal 4 (part by weight) | — | 20 | 20 | — | — | — | — | — |
| Modified Polyacetal 6 (part by weight) | — | — | — | 20 | — | — | — | — |
| Izod Impact Strength (kg · cm/cm) | 20 | 21 | 18 | 17 | 9 | 9 | 9.5 | 9.5 |
| Weld Tensile Strength (kg · cm$^2$) | 345 | 345 | 340 | 330 | 310 | 305 | 305 | 310 |
| Weld Tensile Elongation (%) | 32 | 33 | 30 | 27 | 7 | 6 | 7 | 7 |

It is apparently shown in the results in Table 36 that the resin compositions of the examples which comprise the modified polyacetals exhibit satisfactorily high impact strength, weld strength and weld elongation in comparison with the resin compositions according to the comparative examples.

Examples 191 to 203 and Comparative Examples 66 to 68

Modified Polyacetals 1 to 8 obtained in the preparation examples, a polyacetal (Polyplastics Co., Ltd., DURACON M90), and a glass fiber (Asahi Fiber Glass Co., Ltd., a glass fiber in the form of a chopped strand, fiber diameter 10 μm, fiber length about 3 mm) were dry blended in ratios shown in Table 37 and Table 38. The resultant mixture was molten and kneaded at 190° C. with the use of a biaxial extruder to give pellets. The pellets were molded with an injection molding machine to give test pieces. The tensile strength of the test piece was determined according to ASTM D638, and the bending strength and bending elastic modulus thereof were measured in accordance with ASTM D790. Further, the Izod impact strength of the test pieces was determined according to ASTM D256. The results are set forth in Tables 37 and 38.

TABLE 37

|  | Ex. 191 | Ex. 192 | Ex. 193 | Ex. 194 | Ex. 195 | Ex. 196 | Ex. 197 | Ex. 198 |
|---|---|---|---|---|---|---|---|---|
| Polyacetal (part by weight) | 80 | 70 | 65 | 70 | 60 | 55 | 70 | 70 |
| Glass Fiber (part by weight) | 10 | 20 | 25 | 10 | 20 | 25 | 20 | 20 |
| Modified Polyacetal 1 (part by weight) | 10 | 10 | 10 | 20 | 20 | 20 |  |  |
| Modified Polyacetal 2 (part by weight) |  |  |  |  |  |  | 10 |  |
| Modified Polyacetal 3 (part by weight) |  |  |  |  |  |  |  | 10 |
| Tensile Strength (MPa) | 91 | 121 | 136 | 93 | 126 | 142 | 125 | 121 |
| Bending Strength (MPa) | 142 | 188 | 212 | 145 | 194 | 218 | 193 | 187 |
| Bending Elastic Modulus (MPa) | 4730 | 6880 | 7960 | 4760 | 6940 | 8030 | 6930 | 6870 |
| Impact Strength (J/m) | 72 | 80 | 85 | 75 | 86 | 92 | 85 | 80 |

TABLE 38

|  | Ex. 199 | Ex. 200 | Ex. 201 | Ex. 202 | Ex. 203 | Comp. Ex. 66 | Comp. Ex. 67 | Comp. Ex. 68 |
|---|---|---|---|---|---|---|---|---|
| Polyacetal (part by weight) | 70 | 70 | 70 | 70 | 70 | 90 | 80 | 75 |
| Glass Fiber (part by weight) | 20 | 20 | 20 | 20 | 20 | 10 | 20 | 25 |
| Modified Polyacetal 4 (part by weight) | 10 |  |  |  |  |  |  |  |
| Modified Polyacetal 5 (part by weight) |  | 10 |  |  |  |  |  |  |
| Modified Polyacetal 6 (part by weight) |  |  | 10 |  |  |  |  |  |

TABLE 38-continued

|  | Ex. 199 | Ex. 200 | Ex. 201 | Ex. 202 | Ex. 203 | Comp. Ex. 66 | Comp. Ex. 67 | Comp. Ex. 68 |
|---|---|---|---|---|---|---|---|---|
| Modified Polyacetal 7 (part by weight) |  |  |  | 10 |  |  |  |  |
| Modified Polyacetal 8 (part by weight) |  |  |  |  | 10 |  |  |  |
| Tensile Strength (MPa) | 120 | 118 | 124 | 123 | 123 | 80 | 105 | 120 |
| Bending Strength (MPa) | 185 | 183 | 192 | 191 | 190 | 133 | 170 | 193 |
| Bending Elastic Modulus (MPa) | 6850 | 6830 | 6920 | 6910 | 6900 | 4560 | 6540 | 7540 |
| Impact Strength (J/m) | 79 | 78 | 84 | 83 | 81 | 68 | 74 | 78 |

As shown in Tables 37 and 38, the use of the resin compositions, according to the examples, which comprise the modified polyacetals insure improved mechanical characteristics in comparison with the resin compositions according to the comparative examples.

Examples 204 to 206 and Comparative Examples 69 to 71

By using Modified Polyacetal 1 obtained in the preparation example, a polyacetal (Polyplastics Co., Ltd., DURACON M90), and any of the undermentioned fillers in proportions set forth in Table 39, test pieces were prepared in the similar manner to the above examples. The mechanical characteristics of the test pieces were evaluated, and the results are shown in Table 39. The filers employed are as follows:

Carbon fiber manufactured by Toho Rayon Co., Ltd.

Glass bead manufactured by Toshiba Baroteni Co., Ltd.

Glass flake manufactured by Nippon Plate Glass Co., Ltd.

As apparent from Table 39, the resin compositions comprising the modified polyacetals, according to the examples, are excellent in mechanical characteristics when compared with the resin compositions according to the comparative examples.

We claim:

1. A thermoplastic resin composition which comprises (1) at least one thermoplastic resin and (2) a modified polyacetal which is introduced, to a base polyacetal, with a residue of a polymerizable compound having at least one functional group selected from the group consisting of an epoxy group, a carboxyl group, an acid anhydride group, an ester group, an ether group, an amide group, an amino group, a nitrile group, an isocyanate group, an imide group, a cycloalkyl group, an aryl group and a heterocyclic group containing a nitrogen atom as a hetero atom.

2. A thermoplastic resin composition as claimed in claim 1, wherein said thermoplastic resin (1) is a resin selected from the group consisting of an olefinic polymer, a diene polymer, an acrylic polymer, a styrenic polymer, a vinyl polymer, a polyester, a polyamide, a polycarbonate, a polyurethane, a polyether, a polyacetal, a poly(phenylene ether), a polysulfone, a poly(ether sulfone), a poly(ether imide), a poly(amide imide) and a fluorine-containing resin.

3. A thermoplastic resin composition as claimed in claim 1, wherein said thermoplastic resin composition comprises a modified polyacetal introduced with the residue of the polymerizable compound in a proportion of 0.1 to 30% by weight relative to the base polyacetal.

4. A thermoplastic resin composition as claimed in claim 1, wherein said residue of the polymerizable compound is

TABLE 39

|  | Comp. Ex. 69 | Ex. 204 | Comp. Ex. 70 | Ex. 205 | Comp. Ex. 71 | Ex. 206 |
|---|---|---|---|---|---|---|
| Polyacetal (part by weight) | 80 | 70 | 75 | 65 | 80 | 80 |
| Carbon Fiber (part by weight) | 20 | 20 |  |  |  |  |
| Glass bead (part by weight) |  |  | 25 | 25 |  |  |
| Glass Flake (part by weight) |  |  |  |  | 20 | 20 |
| Modified Polyacetal 1 (part by weight | 0 | 10 | 0 | 10 | 0 | 10 |
| Tensile Strength (MPa) | 166 | 189 | 61 | 73 | 58 | 66 |
| Bending Strength (MPa) | 235 | 259 | 100 | 119 | 102 | 112 |
| Bending Elastic Modulus (MPa) | 12300 | 12980 | 3530 | 3640 | 3520 | 3600 |
| Impact Strength (J/m) | 58 | 66 | 37 | 44 | 36 | 41 | introduced in a proportion of 0.2 to 25% by weight relative to the base polyacetal.

5. A thermoplastic resin composition as claimed in claim 1, wherein said polymerizable compound containing a functional group has at least one ethylenically unsaturated bond per molecule.

6. A thermoplastic resin composition as claimed in claim 1, wherein said polymerizable compound containing a functional group has one ethylenically unsaturated bond per molecule.

7. A thermoplastic resin composition as claimed in claim 1, wherein said polymerizable compound containing a functional group has, per molecule, one ethylenic double bond, and at least one functional group selected from the group consisting of an epoxy group, a carboxyl group, an acid anhydride group, an ester group, an N-substituted amide group having a non-condensible functional group bonded to the nitrogen atom, an amino group, a nitrile group, an isocyanate group, an imide group, a cyclic imino ester group and a cyclic imino ether group, and has a boiling point of not lower than 70° C. at atmospheric pressure.

8. A thermoplastic resin composition as claimed in claim 1, wherein said polymerizable compound having a functional group is an ethylenically polymerizable compound having (i) an epoxy group, (ii) a carboxyl group, (iii) an acid anhydride group or (iv) an amide bond and an epoxy group.

9. A thermoplastic resin composition as claimed in claim 1, wherein said polymerizable compound having a functional group is a maleic anhydride or a compound shown by the following formula

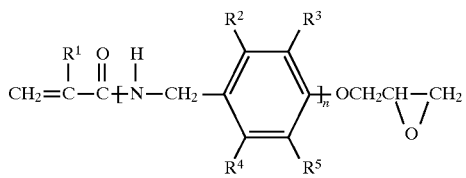

wherein $R^1$ represents a hydrogen atom or a methyl group; $R^2$, $R^3$, $R^4$ and $R^5$ represent, the same or different, a hydrogen atom, a halogen atom, an alkyl group, an alkoxy group, an alkoxycarbonyl group, an acyl group or an acyloxy group; and n denotes 0 or 1.

10. A thermoplastic resin composition as claimed in claim 1, wherein the relative proportion of said thermoplastic resin (1) to said modified polyacetal (2) is such that the former (1)/the latter (2) equals 1/99 to 99/1 (by weight).

11. A thermoplastic resin composition as claimed in claim 1, wherein said thermoplastic resin comprises two or more species of resins being immiscible with each other.

12. A thermoplastic resin composition as claimed in claim 11, wherein the relative ratio of (1) the two or more species of thermoplastic resins being immiscible with each other to (2) the modified polyacetal is such that the former (1)/the latter (2) equals 50/50 to 99/1 (by weight).

13. A thermoplastic resin composition as claimed in claim 1, wherein said thermoplastic resin comprises (1a) a polyacetal and (1b) a thermoplastic resin except for a polyacetal.

14. A thermoplastic resin composition as claimed in claim 13, wherein the proportion of the polyacetal (1a) relative to the thermoplastic resin (1b) except for a polyacetal is such that the former (1a)/the latter (1b) equals 1/99 to 99/1 (by weight).

15. A thermoplastic resin composition as claimed in claim 13, wherein the proportion of the total amount of said polyacetal (1a) and said thermoplastic resin (1b) relative to the modified polyacetal (2) is such that the total amount of the components (1a) and (1b) the modified polyacetal (2) equals 50/50 to 99/1 (by weight).

16. A thermoplastic resin composition as claimed in claim 1, wherein said thermoplastic resin composition further comprises a core-sheath polymer in addition to the polyacetal as a thermoplastic resin.

17. A thermoplastic resin composition as claimed in claim 16, wherein the relative ratio of said polyacetal to said core-sheath polymer is such that the polyacetal/the core-sheath polymer equals 99/1 to 60/40 (by weight).

18. A thermoplastic resin composition which comprises;
(1) at least one thermoplastic resin selected from the group consisting of a polyethylene, a polypropylene, an ethylene-α-olefin copolymer, a poly(methyl methacrylate), an acrylic rubber, a polystyrene, a styrenic copolymer, a poly(vinyl chloride), a poly (alkylene terephthalate), a co-polyester comprising an alkylene terephthalate as a main component, a polyarylate, a liquid crystalline polyester, an aliphatic polyamide, an aromatic polyamide, a liquid crystalline copolyesteramide, a bisphenolic polycarbonate, a polyurethane, a polyacetal, a polyphenylene ether, a polysulfone, a poly(ether sulfone), a poly(ether imide), a poly(amide imide) and a fluorine-containing resin, and
(2) a modified polyacetal having one ethylenically unsaturated bond per molecule and being modified by graft-polymerization or addition polymerization with a polymerizable compound having a boiling point of not lower than 120° C.,
wherein said modified polyacetal is introduced with a residue of polymerizable compound having at least one functional group selected from the group consisting of an epoxy group, a carboxyl group, an acid anhydride group, an ester group, an amide group having a non-self-condensible functional group, an amino group, a nitrile group, an isocyanate group, an imide group, a cyclic imino ester group and cyclic imino ether group in a proportion of 0.3 to 20% by weight relative to a base polyacetal, and the proportions (by weight) of the each components are some of the following (a) to (c):
(a) when the thermoplastic resin comprises one thermoplastic resin or plural species of thermoplastic resins being miscible with each other:
(1) the thermoplastic resin/(2) the modified polyacetal equals 5/95 through 95/5;
(b) when the thermoplastic resin comprises two or more thermoplastic resins being immiscible with each other:
(1) the thermoplastic resin/(2) the modified polyacetal equals 70/30 through 99/1;
(c) when the thermoplastic resin comprises a polyacetal and a thermoplastic resin except for a polyacetal:
(1) the thermoplastic resin/(2) the modified polyacetal equals 70/30 through 99/1.

19. A thermoplastic resin composition which comprises (I) a modified polymer composition containing (1c) a modified polymer which is a thermoplastic resin selected from the group consisting of an olefinic polymer, a diene polymer, an acrylic polymer, a styrenic polymer, a vinyl polymer, a polyether, a poly(phenylene ether), a polysulfone, a poly (ether sulfone), a poly(ether imide) and a poly(amide imide), and said thermoplastic resin is introduced with at least one functional group selected from the group consisting of an epoxy group, a carboxyl group, an acid anhydride group, an ester group, an ether group, an amide group, an amino group, an imide group, an isocyanate group and a heterocyclic group containing a nitrogen atom as a hetero atom, and (II) a modified polyacetal resin composition containing (2) a modified polyacetal which is introduced, to a base polyacetal, with a residue of a polymerizable compound having at least one functional group selected from the group consisting of an epoxy group, a carboxyl group, an acid anhydride group, an ester group, an ether group, an amide group, an amino group, a nitrile group, an isocyanate group, an imide group, a cycloalkyl group, an aryl group and a heterocyclic group containing a nitrogen atom as a hetero atom.

20. A thermoplastic resin composition as claimed in claim 19, wherein said modified polymer composition (I) comprises 1 to 100% by weight of (1c) the modified polymer and 0 to 99% by weight of (1d) a non-modified polymer except for a polyacetal, and said modified polyacetal resin composition (II) comprises 1 to 100% by weight of (2) the modified polyacetal and 0 to 99% by weight of (1a) a polyacetal.

21. A thermoplastic resin composition as claimed in claim 20, wherein said modified polymer (1c) is a polymer derived from said non-modified polymer (1d).

22. A thermoplastic resin composition as claimed in claim 19, wherein the proportion of the modified polymer composition (I) relative to the modified polyacetal resin composition (II) is such that the former (I)/the latter (II) equals 1/99 through 99/1 (by weight).

23. A thermoplastic resin composition as claimed in claim 19, wherein said modified polymer (1c) is a thermoplastic resin selected from the group consisting of an olefinic polymer, a diene polymer, an acrylic polymer, a styrenic polymer, a vinyl polymer, a polyether, a poly(ophenylene ether), a polysulfone, a poly(ether sulfone), a poly(ether imide) and a poly(amide imide), and said thermoplastic resin is introduced with at least one functional group selected from the group consisting of an epoxy group, a carboxyl group, an acid anhydride group, an ester group, a hydroxyl group, an ether group, an amide group, an amino group, an imide group, an isocyanate group and a heterocyclic group containing a nitrogen atom as a hetero atom.

24. A thermoplastic resin composition as claimed in claim 20, wherein said non-modified polymer (1d) is a non-modified thermoplastic resin selected from the group consisting of a polyethylene, a polypropylene, an ethylene-α-olefin copolymer, an olefinic elastomer, a poly(methyl methacrylate), an acrylic rubber, a polystyrene, a styrenic copolymer, a poly(vinyl chloride), poly(phenylene ether), a polysulfone, a poly(ether sulfone), a poly(ether imide) and a poly(amide imide).

25. A thermoplastic resin composition as claimed in claim 19, which comprises (I) the modified polymer composition comprising 5 to 95% by weight of (1c) the modified polymer except for a modified polyacetal and 95 to 5% by weight of (1d) a non-modified polymer except for a polyacetal, and (II) the modified polyacetal resin composition comprising 5 to 95% by weight of (2) the modified polyacetal and 95 to 5% by weight of a polyacetal (1a), wherein the relative proportion of said modified polymer composition (I) to said modified polyacetal resin composition (II) is such that the former/the latter equals 5/95 through 95/5 (by weight).

26. A thermoplastic resin composition which comprises (1a) a polyacetal, (1e) an elastomer and (2a) a modified polyacetal being introduced with an epoxy group to a base polyacetal.

27. A thermoplastic resin composition as claimed in claim 26, wherein said elastomer (1e) has a functional group reactable with the epoxy group.

28. A thermoplastic resin composition as claimed in claim 27, wherein said functional group is at least one member selected from the group consisting of a carboxyl group, an acid anhydride group, a hydroxyl group, an amino group and a mercapto group.

29. A thermoplastic resin composition as claimed in claim 26, wherein said elastomer (1e) is at least one member selected from the group consisting of an olefinic elastomer, an acrylic elastomer, a styrenic elastomer, a polyester elastomer, a polyurethane elastomer and a polyamide elastomer.

30. A thermoplastic resin composition as claimed in claim 26, wherein the relative ratio of the polyacetal (1a) to the elastomer (1e) is 50/50 through 99/1 (by weight), and the relative proportion of the total amount of the polyacetal (1a) and the elastomer (1e) to the modified polyacetal (2a) is such that the total amount of the components (1a) and (1e)/the modified polyacetal (2a) equals 70/30 through 99/1 (by weight).

31. A thermoplastic resin composition as claimed in claim 1, wherein said thermoplastic resin composition further comprises a filler.

32. A method of producing a thermoplastic resin composition which comprises mixing (1) at least one thermoplastic resin and (2) a modified polyacetal which is introduced, to a base polyacetal, with a residue of a polymerizable compound having at least one functional group selected from the group consisting of an epoxy group, a carboxyl group, an acid anhydride group, an ester group, an ether group, an amide group, an amino group, a nitrite group, an isocyanate group, an imide group, a cycloalkyl group, an aryl group and a heterocyclic group having a nitrogen atom as a hetero atom.

33. A thermoplastic resin composition as claimed in claim 1, wherein said polymerizable compound has at least one functional group selected from the group consisting of an epoxy group, a carboxyl group, an acid anhydride group and an amide group.

34. A thermoplastic resin composition as claimed in claim 33, wherein said thermoplastic resin (1) is a resin selected from the group consisting of an olefinic polymer, a diene polymer, an acrylic polymer, a styrenic polymer, a vinyl polymer, a polyester, a polyamide, a polycarbonate, a polyurethane, a polyether, a polyacetal, a poly(phenylene ether), a polysulfone, a poly(ether sulfone), a poly(ether imide), a poly(amide imide) and a fluorine-containing resin.

35. A thermoplastic resin composition as claimed in claim 33, wherein said thermoplastic resin comprises (1a) a polyacetal and (1b) a thermoplastic resin except for a polyacetal.

36. A thermoplastic resin composition as claimed in claim 33, wherein said thermoplastic resin composition further comprises a core-sheath polymer in addition to the polyacetal as a thermoplastic resin.

* * * * *

REEXAMINATION CERTIFICATE (4082nd)

United States Patent
Kanai et al.

[11] B1 5,852,135
[45] Certificate Issued May 9, 2000

[54] THERMOPLASTIC RESIN COMPOSITIONS AND A METHOD OF PRODUCING THE SAME

[75] Inventors: Hiroyuki Kanai, Fuji; Hajime Serizawa, Mishima; Mitsunori Matsushima, Shizuoka, all of Japan

[73] Assignee: Polyplastics Co., Ltd., Osaka, Japan

Reexamination Request:
No. 90/005,449, Aug. 12, 1999

Reexamination Certificate for:
Patent No.: 5,852,135
Issued: Dec. 22, 1998
Appl. No.: 08/750,523
Filed: Dec. 12, 1996

[22] PCT Filed: Oct. 19, 1995
[86] PCT No.: PCT/JP95/02139
§ 371 Date: Dec. 12, 1996
§ 102(e) Date: Dec. 12, 1996
[87] PCT Pub. No.: WO96/34053
PCT Pub. Date: Oct. 31, 1996

[30] Foreign Application Priority Data

| Apr. 19, 1995 | [JP] | Japan | 7/129432 |
| Aug. 2, 1995 | [JP] | Japan | 7/218188 |
| Aug. 18, 1995 | [JP] | Japan | 7/233263 |
| Aug. 29, 1995 | [JP] | Japan | 7/245363 |
| Sep. 28, 1995 | [JP] | Japan | 7/276645 |
| Oct. 4, 1995 | [JP] | Japan | 7/284635 |

[51] Int. Cl.[7] ................................................. C08L 61/02
[52] U.S. Cl. .......................... 525/398; 525/399; 525/400
[58] Field of Search .................................. 525/398, 399, 525/400

[56] References Cited

U.S. PATENT DOCUMENTS

| 3,398,074 | 8/1968 | Eguchi et al. . |
| 3,546,321 | 12/1970 | Jabloner et al. . |
| 5,183,860 | 2/1993 | Kashihara . |

FOREIGN PATENT DOCUMENTS

| 0 449 605 | 10/1991 | European Pat. Off. . |
| 42 20 773 | 1/1994 | Germany . |
| 43-23467 | 10/1968 | Japan . |
| 47-19425 | 6/1972 | Japan . |
| 49-74790 | 7/1974 | Japan . |
| 58-18383 | 4/1983 | Japan . |
| 60-6969 | 2/1985 | Japan . |
| 60-219252 | 11/1985 | Japan . |
| 10773 | 3/1988 | Japan . |
| 3-21618 | 1/1991 | Japan . |
| 3-21619 | 1/1991 | Japan . |
| 14856 | 11/1991 | Japan . |
| 3-292314 | 12/1991 | Japan . |
| 5-032858 | 2/1993 | Japan . |
| 5-32857 | 2/1993 | Japan . |
| 5-32858 | 2/1993 | Japan . |
| 5-214212 | 8/1993 | Japan . |
| 271361 | 11/1993 | Japan . |
| 1172741 | 9/1967 | United Kingdom . |

OTHER PUBLICATIONS

Patent Abstract of Japan, vol. 17, No. 327 (C–1073), Jun. 22, 1993 and JP 05 032858 A (Polyplastics Co.), Feb. 9, 1993.

*Primary Examiner*—Edward J. Cain

[57] ABSTRACT

A resin composition comprises (1) a thermoplastic resin and (2) a modified polyacetal wherein a residue of a polymerizable compound having a functional group such as an epoxy group, a carboxyl group, an acid anhydride group or others is introduced to a base polyacetal in a proportion of 0.1 to 30% by weight relative to the base polyacetal. The thermoplastic resin includes various polymers such as an olefinic polymer, a styrenic polymer, a polyester, a polyamide and so on. The thermoplastic resins can be used singly or in combination, and the latter combination includes a combination of two or more species of resins being immiscible with each other, a combination of a polyacetal and a resin except for a polyacetal (e.g. an elastomer, etc.) and other combinations. The relative ratio of (1) the thermoplastic resin to (2) the modified polyacetal is such that the former/the latter equals about 1/99 through 99/1 (by weight).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–36 is confirmed.

\* \* \* \* \*